(12) United States Patent
Li et al.

(10) Patent No.: US 10,937,227 B2
(45) Date of Patent: Mar. 2, 2021

(54) PLANAR VISUALIZATION OF ANATOMICAL STRUCTURES

(71) Applicant: Siemens Healthcare GmbH, Erlangen (DE)

(72) Inventors: Xinyun Li, Suzhou (CN); Rainer Kaergel, Forchheim (DE); Michael Suehling, Erlangen (DE); Chris Schwemmer, Forchheim (DE); Max Schoebinger, Hirschaid (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 151 days.

(21) Appl. No.: 15/998,848

(22) Filed: Aug. 17, 2018

(65) Prior Publication Data

US 2019/0057541 A1 Feb. 21, 2019

(30) Foreign Application Priority Data

Aug. 18, 2017 (DE) .......................... 102017214447.5

(51) Int. Cl.
*G06T 15/08* (2011.01)
*G06T 19/00* (2011.01)
(Continued)

(52) U.S. Cl.
CPC ............ *G06T 15/08* (2013.01); *G06T 3/0031* (2013.01); *G06T 5/006* (2013.01); *G06T 7/60* (2013.01);
(Continued)

(58) Field of Classification Search
CPC ....... G06T 11/008; G06T 15/08; G06T 19/00; G06T 2207/10081; G06T 2207/20168;
(Continued)

(56) References Cited

U.S. PATENT DOCUMENTS 7,233,329 B2 6/2007 Moreau-Gobard
7,447,535 B2 * 11/2008 Lavi ................... A61B 5/02007
382/128
(Continued)

FOREIGN PATENT DOCUMENTS

EP 2554120 A1 2/2013

OTHER PUBLICATIONS

Marino et al, Planar Visualization of Treelike Structures, IEEE Transaction on Visualization and Computer Graphics, vol. 22, Jan. 2016, pp. 906-915 (Year: 2016).*

(Continued)

*Primary Examiner* — Lewis G West
(74) *Attorney, Agent, or Firm* — Harness, Dickey & Pierce, P.L.C.

(57) ABSTRACT

A method, for two-dimensional mapping of anatomical structures of a patient, includes acquiring three-dimensional image data of anatomical structures of a patient; adapting a virtual network structure to a spatial course of the anatomical structures; defining a user-defined map projection for projection of two-dimensional pixel positions of an image to be output onto a geometric figure around a center of the anatomical structures for which mapping onto a two-dimensional space is defined; ascertaining points of intersection of radially extending half lines assigned to the two-dimensional pixel positions of the image to be output with the virtual network structure; and ascertaining the image to be output based upon image intensity values assigned to the points of intersection ascertained. A method for two-dimensional mapping of the tree-like elongated structure of the patient; a method for simultaneous mapping of a tree-like elongated structure; and corresponding apparatuses are also described.

21 Claims, 14 Drawing Sheets

(51) Int. Cl.
*G06T 3/00* (2006.01)
*G06T 5/00* (2006.01)
*G06T 7/60* (2017.01)
*G06T 11/00* (2006.01)

(52) U.S. Cl.
CPC ............ *G06T 11/008* (2013.01); *G06T 19/00* (2013.01); *G06T 2207/10081* (2013.01); *G06T 2207/20168* (2013.01); *G06T 2207/30048* (2013.01); *G06T 2207/30101* (2013.01); *G06T 2207/30172* (2013.01); *G06T 2210/22* (2013.01); *G06T 2210/41* (2013.01); *G06T 2215/06* (2013.01); *G06T 2219/021* (2013.01)

(58) Field of Classification Search
CPC . G06T 2207/30048; G06T 2207/30101; G06T 2207/30172; G06T 2210/22; G06T 2210/41; G06T 2215/06; G06T 2219/021; G06T 3/0031; G06T 5/006; G06T 7/60
See application file for complete search history.

(56) References Cited

U.S. PATENT DOCUMENTS

| | | | | |
|---|---|---|---|---|
| 2005/0024724 | A1* | 2/2005 | Kim | G06T 19/00 359/462 |
| 2006/0235288 | A1* | 10/2006 | Lavi | A61B 5/02007 600/407 |
| 2009/0161927 | A1* | 6/2009 | Mori | G06T 7/74 382/128 |
| 2009/0310840 | A1* | 12/2009 | Mohamed | A61B 17/12118 382/131 |
| 2010/0135561 | A1* | 6/2010 | Moulik | G06T 7/11 382/131 |
| 2010/0152570 | A1* | 6/2010 | Navab | A61B 90/36 600/411 |
| 2010/0215149 | A1* | 8/2010 | Takemoto | A61B 5/02007 378/98 |
| 2013/0009958 | A1* | 1/2013 | Kitamura | A61B 6/503 345/424 |
| 2014/0288415 | A1* | 9/2014 | Forzoni | A61B 8/0833 600/424 |
| 2016/0004917 | A1* | 1/2016 | Yoshida | G16H 30/20 382/115 |
| 2016/0078677 | A1* | 3/2016 | Igarashi | G16H 50/30 382/131 |
| 2016/0346042 | A1* | 12/2016 | Nomiyama | G06T 17/00 |
| 2017/0024886 | A1* | 1/2017 | Dickrell, III | A61B 5/026 |
| 2017/0103520 | A1* | 4/2017 | Gopinath | A61B 5/489 |
| 2017/0172663 | A1* | 6/2017 | Popovic | G06T 7/30 |
| 2017/0312031 | A1* | 11/2017 | Amanatullah | G09B 23/30 |
| 2018/0121760 | A1* | 5/2018 | Santamaria-Pang | G06K 9/6274 |
| 2018/0310905 | A1* | 11/2018 | Yoshida | A61B 6/503 |
| 2019/0025358 | A1* | 1/2019 | Rowell | H04B 17/15 |
| 2019/0114790 | A1* | 4/2019 | Schallek | G06K 9/46 |
| 2020/0027546 | A1* | 1/2020 | Nasu | G16H 30/40 |

OTHER PUBLICATIONS

Garreau et al, A Knowledge Based Approach for 3-D Reconstruction and Labeling of Vascular Networks from Biplane Angiographic Projections, IEEE Transactions on Medical Imaging, vol. 10, Jun. 1991, pp. 122-131 (Year: 1991).*

Kanitsar et al, CPR—Curved Planar Reformation, IEEE Visualization, Oct. 2002, pp. 37-44 (Year: 2002).*

Kanitsar et al.: "Advanced Curved Planar Reformation: Flattening of Vascular Structures", Inst. of Computer Graphics and Algorithms, Vienna University of Technology, XP031173479; pp. 43-50; DOI: 10.1109/VISUAL.2003.1250353; ISBN: 978-0-7803-8120-9;VIS 2003. IEEE Visualization 2003; Proceedings. Seattle, WA, Oct. 19-24, 2003.

German Office Action for German Application No. 10-2017-214-447.5 dated Apr. 16, 2018.

* cited by examiner

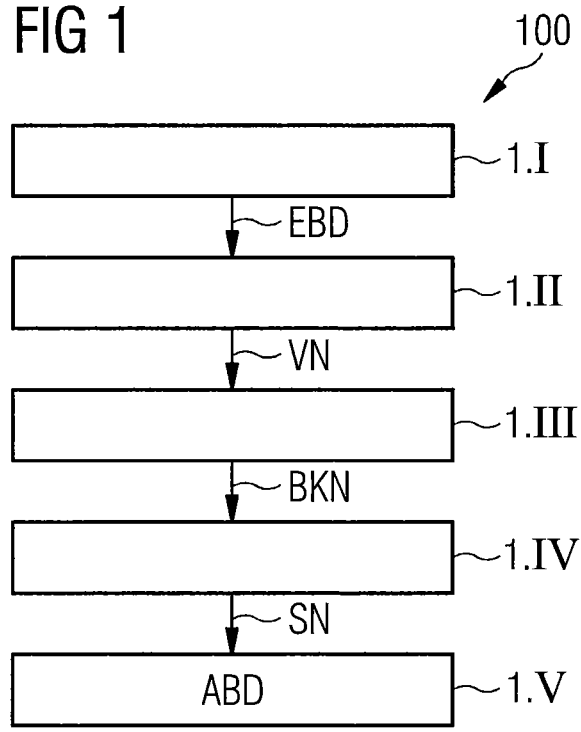
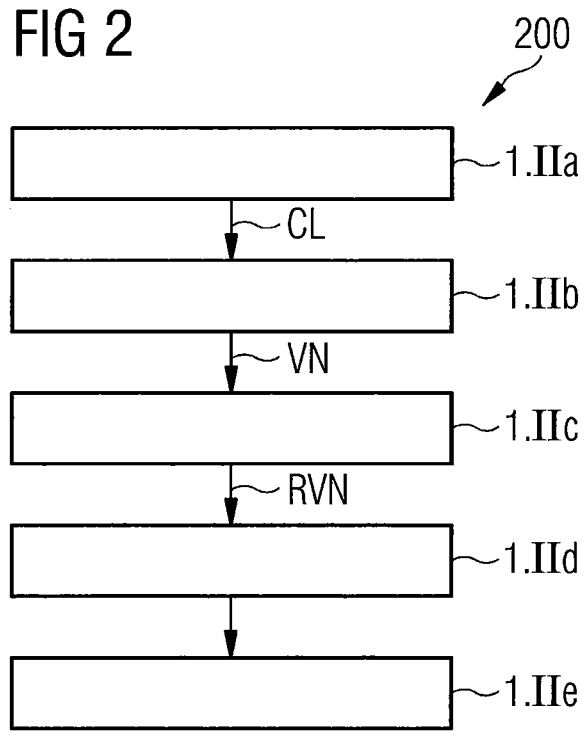

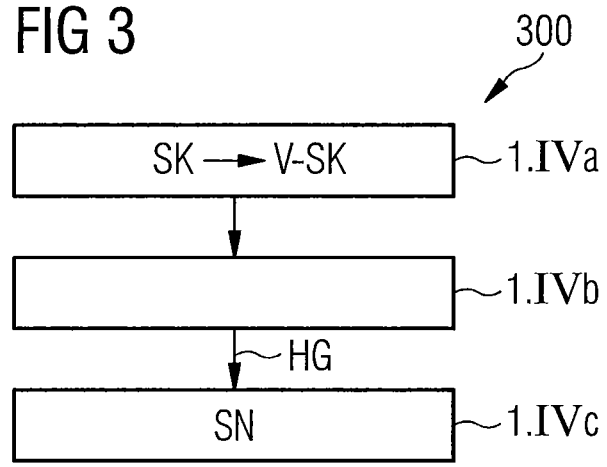
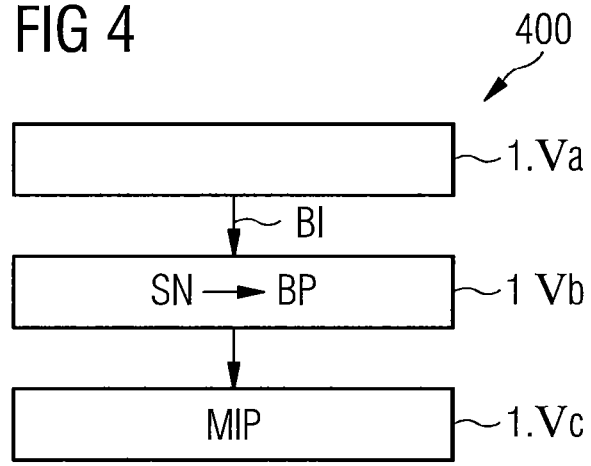

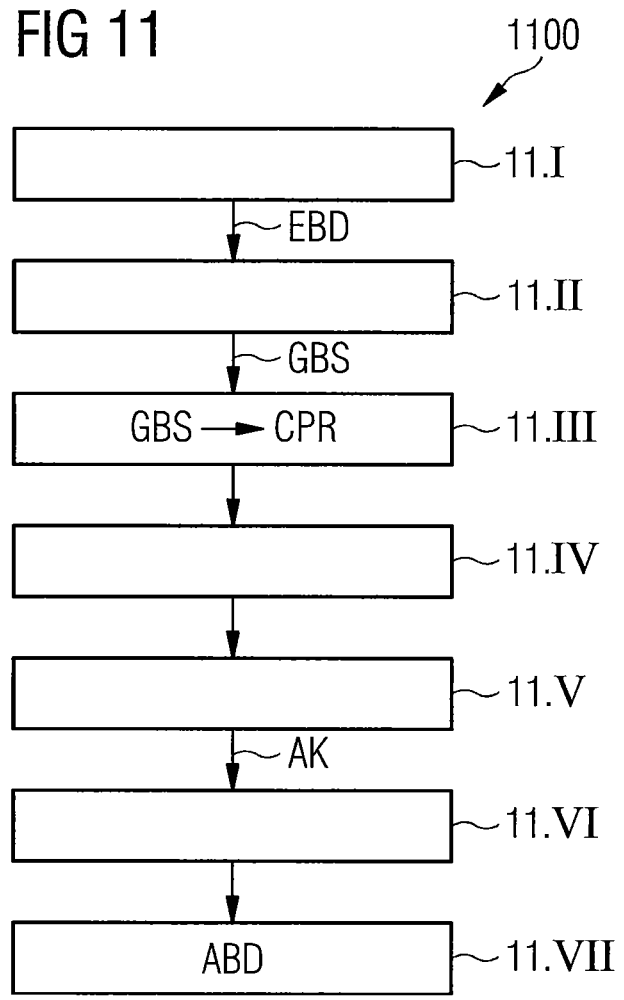

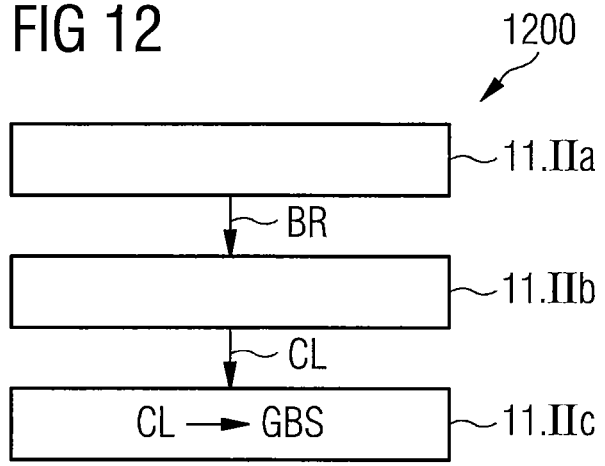
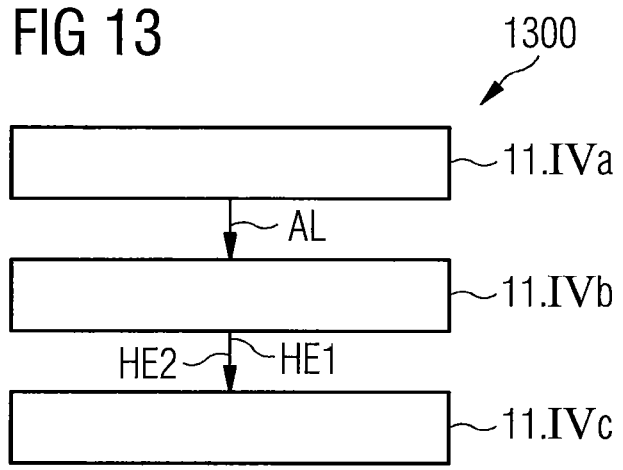

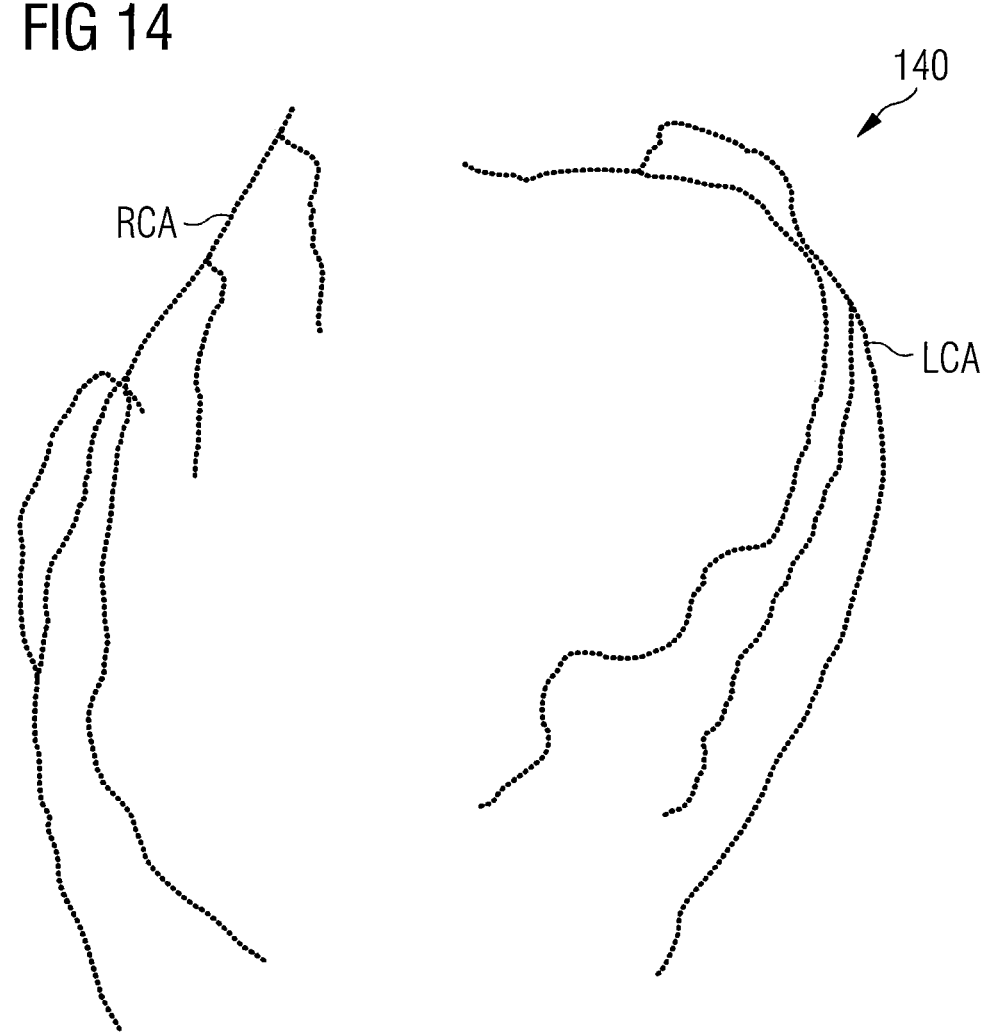

PLANAR VISUALIZATION OF ANATOMICAL STRUCTURES

PRIORITY STATEMENT

The present application hereby claims priority under 35 U.S.C. § 119 to German patent application number DE 102017214447.5 filed Aug. 18, 2017, the entire contents of which are hereby incorporated herein by reference.

FIELD

At least one embodiment of the application invention generally relates to a method for two-dimensional mapping of anatomical structures of a patient. At least one embodiment of the invention also generally relates a method for two-dimensional mapping of a tree-like elongated structure of a patient. Furthermore, at least one embodiment of the invention generally relates to a method for simultaneous imaging of a tree-like elongated structure. In addition, at least one embodiment of the invention generally relates to an apparatus for two-dimensional mapping of anatomical structures of a patient. At least one embodiment of the invention further generally relates to an apparatus for two-dimensional mapping of a tree-like elongated structure of a patient. At least one embodiment of the invention also generally relates to an apparatus for simultaneous mapping of a tree-like elongated structure.

BACKGROUND

Computer-aided visualization methods play an important role in clinical application, since they provide a very flexible and effective option for examining data obtained from medical imaging methods. To date, the standard method in diagnostic radiology has been a slice-by-slice examination of standardized views oriented orthogonally to one another. Unfortunately, direct viewing and evaluation is not ideal for many tasks since the anatomical structures do not generally run conformally with the coordinate system of the computed tomography scanner or the imaging medical device and conventionally have complex forms.

In CT angiography, CTA for short, blood vessels are represented in order to detect vascular anomalies. For this, for example coronary arteries, or also other arteries, are examined in the body of a patient. To facilitate more flexible viewing of medical datasets, multiplanar reformation (MPR) was developed in order to represent reconstructed CT volumes in planes in any orientation. However, viewing the blood vessels in conventional MPR representations is very tedious since, for example, coronary vessels have a complex three-dimensional geometry so that only a small section of each artery can be identified in an image representation since in each case only a small part of the arteries intersect the represented image slice.

In view of the difficulties mentioned, methods have been developed for the visualization of recorded medical image data that take account of the specific anatomical circumstances.

Another type of image representation is based on curved planar reformation (CPR) and enables flexible cuts through the datasets that are defined by individual geometric center lines or complex center line graphs. CPRs are typically used in the visualization of vessels since the cuts generated permit a careful examination of the lumen of the vessels and include valuable anatomical context. In contrast to MPRs, CPRs are directly controlled by patient-specific anatomical data and this ultimately leads to more information being condensed in a single 2D view that can be rotated about the longitudinal axis.

While conventional curved planar reformations enable individual coronary segments to be visualized in their full length in a single image, they cannot be used to represent an entire a plurality of segments of a coronary system so that the anatomical context is lost.

Conformal maps have the property of angle-preserving mapping and this is particularly important if it is desirable for similarity of the object to be mapped to be retained in the projection. The conformality of the images plays an important role in medical image registrations. However, even with conformal maps, local or global scaling occurs. This leads to enlarged or reduced representation of individual regions and produces an unnatural-looking parameterization result. There are other approaches in which there is an attempt to combine the aim of conformality and rigidity with one another; this is also called an ARAP paradigm (ARAP=as rigid as possible). In particular at local level, this avoids excessive distortions in length while still retaining the greatest possible conformality. It in particular prevents some regions from being mapped as much too large or too small and hence the clarity and user-friendliness of the representation is ensured.

Therefore, there is a requirement for a visualization method with which complex three-dimensional structures of all coronary sections can be mapped on a planar image representation which permits quick examination of the entire vascular tree wherein the anatomical context is retained and user interactions are enabled. At the same time, geometric distortion should be minimized.

Conventionally, CPR representations of a plurality of different vascular segments are viewed in sequence and next to one another in separate views, but this procedure results in an artificial-looking and schematic visualization and to a loss of the tree structure underlying the vascular system and hence the anatomical context.

U.S. Pat. No. 7,447,535 B2 describes an attempt to visualize all coronary segments in a single image. Herein, a spherical network is deformed by extrusion along its normals in order to adapt it to the coronary structures. The structures are then scanned along the network and the scanned values transmitted back to the sphere. These values are then mapped with the aid of a Mercator projection onto a two-dimensional image.

However, this method following has the following drawbacks:

The described network adaptation technique results in vessel parts not being mapped in cases in which numerous vessels lie in the direction of the sphere normals that were used for the extrusion. Only one of these vessels intersects the network generated. Extrusion for each sphere normal (as in the conventional method) stops at a specific point, to be precise, a point of a vessel. Hence, the network formed does not contain vascular points lying before or after this point along the normal.

Mercator projection is not particularly suitable for the generation of an overview representation since most of the regions of the representation generated are distorted. In particular, image sections that are more remote from the horizontal line in the center of the image representation are greatly distorted.

A sphere is not an ideal starting point for deformation, since, depending on the position, the geometry of the vessels and the quality of the scanning of the vessels, some coronary segments could point in the direction of the center of the sphere and this results in deep indentations in the network thereby impairing the image quality.

In addition, this procedure produces a static two-dimensional image that does not provide an option of user interaction, such as, for example, "slicing".

Other approaches are described in U.S. Pat. No. 7,233,329 B2. Here, a maximum intensity projection (MIP) is generated along a beam before and after points of intersection of the beam with a network.

SUMMARY

The inventors have discovered that it is not guaranteed, with the method of U.S. Pat. No. 7,233,329 B2, that that the network generated intersects all vessels and hence also that all vessels are mapped. Furthermore, the inventors have discovered that success of the method is dependent on the choice of scan increments and the approximation of the initial heart network. In addition, the inventors have discovered that artifacts are generated as a result of scanning non-smooth surfaces. Since the projection is performed along a plurality of positions along a ray, it is only possible to generate a thick MIP slice. Further, the inventors have discovered that the generation of one more thin slices is not possible with this method.

Therefore, at least one embodiment of the present application includes development of a planar visualization method that enables comprehensive mapping of complex vascular structures that is as conformal as possible.

Embodiments of the present application are directed to a method for two-dimensional mapping of anatomical structures of a patient; a method for two-dimensional mapping of a tree-like elongated structure of a patient; a method for simultaneous mapping of a tree-like elongated structure; an apparatus for two-dimensional mapping of anatomical structures of a patient; an apparatus for two-dimensional mapping of a tree-like elongated structure of a patient; and an apparatus for simultaneous mapping of a tree-like elongated structure.

A method according to at least one embodiment of the invention for two-dimensional mapping of anatomical structures of a patient entails the acquisition of three-dimensional image data of a hollow structure of a patient. The three-dimensional image data can, for example, be generated or acquired with the aid of a medical imaging device, such as, for example, a computed tomography system or a magnetic resonance tomography system.

With the method according to at least one embodiment of the invention for two-dimensional mapping of a tree-like elongated structure of a patient, three-dimensional image data of a tree-like elongated vascular structure of a patient is acquired. In this context, the term "tree-like elongated structure" should be understood to mean a branched, linear structure, for example a branched tubular structure. Such structures can, for example, include vascular structures or structures in the respiratory or digestive tract. In the case of vascular structures, these can include both an arrangement of an individual vessel or a vascular tree and an ensemble of a plurality of vessels or vascular trees. Tree-like elongated structures are then identified on the basis of the acquired three-dimensional image data. Identification of this kind, can, for example, take place by marking positions in the three-dimensional image data at which the tree-like elongated structures were localized.

The apparatus according to at least one embodiment of the invention for two-dimensional mapping of anatomical structures of a patient comprises an input interface for the acquisition of three-dimensional image data of anatomical structures of a patient. For the reception of the image data, the input interface can, for example, be connected to an imaging medical device, such as, for example, a computed tomography system or a magnetic resonance tomography system. The input interface can also be connected to a data network into which a medical imaging device is integrated.

The apparatus according to at least one embodiment of the invention for two-dimensional mapping of tree-like elongated structures of a patient comprises an input interface for the acquisition of three-dimensional image data of a tree-like elongated structure of a patient. Another part of the apparatus according to the invention for two-dimensional mapping of tree-like elongated structures of a patient is an identification unit for the identification of tree-like elongated structures on the basis of the acquired three-dimensional image data. Another part of the apparatus according to the invention is a reformatting unit for the ascertainment of curved planar reformations for the tree-like elongated structures.

At least one embodiment is also achieved by a corresponding non-transitory computer program product with a computer program which can be loaded directly into a storage device of an imaging medical device with program sections for carrying out all the steps of the method according to at least one embodiment of the invention when the program is executed in the imaging medical device. In addition to the computer program, a computer program product of this kind can optionally also include additional parts such as, for example, documentation and/or additional components and also hardware components, such as, for example, hardware keys (dongles etc.) for using the software.

Transportation to the medical imaging device and/or storage on or in the in the medical imaging device can take place by way of a non-transitory computer-readable medium, for example a memory stick, a hard disk or another kind of. transportable or integrated data carrier on which the program sections of the computer program which can be read-in and executed by a computing are stored. To this end, the computing unit can, for example, comprise one or more interacting microprocessors or the like.

BRIEF DESCRIPTION OF THE DRAWINGS

The invention is explained once again in more detail in the following with reference to the figures and example embodiments. Herein, in the different figures, the same components are denoted by identical or corresponding reference characters. As a rule, the figures are not to scale. In the figures:

FIG. 1 shows a flow diagram illustrating a method for two-dimensional mapping of a hollow structure of a patient according to an example embodiment of the invention, FIG. 2 shows a flow diagram illustrating a substep of the method illustrated in FIG. 1 in which a virtual network structure is adapted to the spatial course of a hollow structure, FIG. 3 shows a flow diagram illustrating a substep of the method illustrated in FIG. 1 in which points of intersection of radially extending half lines with the virtual network structure are ascertained, FIG. 4 shows a flow diagram illustrating a substep of the method illustrated in FIG. 1 in which an output image is ascertained on the basis of image intensity values assigned to the ascertained points of intersection, FIG. 11 shows a flow diagram illustrating a method for two-dimensional mapping of a vascular structure of a patient according to an example embodiment of the invention, FIG. 12 shows a flow diagram illustrating a step for the identification of vascular tree structures on the basis of acquired three-dimensional image data of the method illustrated in FIG. 11 in detail, FIG. 13 shows a flow diagram illustrating a step for the rotation of opposite vascular segments of the method illustrated in FIG. 11 in detail, FIG. 14 shows a schematic representation of a heart with a left and a right coronary artery each including a vascular tree.

DETAILED DESCRIPTION OF THE EXAMPLE EMBODIMENTS

Figure 5:
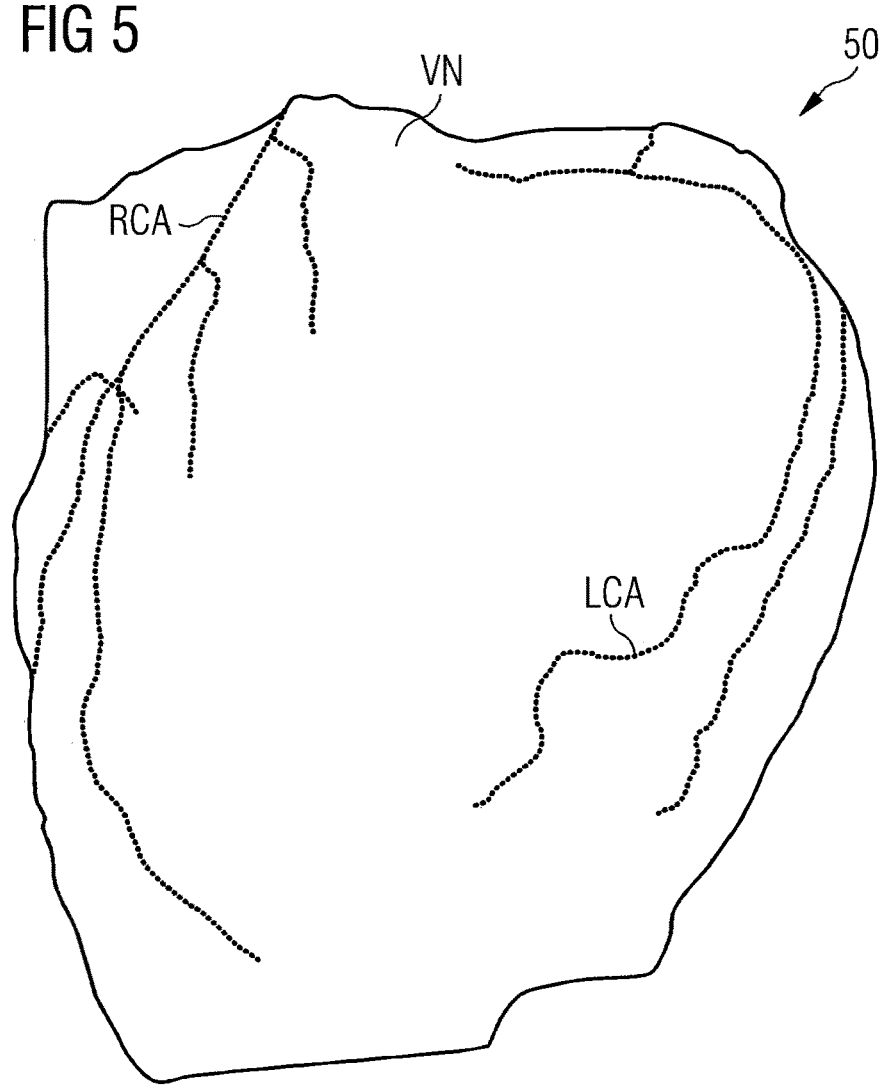
FIG. 5 shows a schematic representation of a virtual network structure adapted using the ARAP method to all points lying on previously ascertained coronary vessels.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

A method according to at least one embodiment of the invention for two-dimensional mapping of anatomical structures of a patient entails the acquisition of three-dimensional image data of a hollow structure of a patient. The three-dimensional image data can, for example, be generated or acquired with the aid of a medical imaging device, such as, for example, a computed tomography system or a magnetic resonance tomography system.

The anatomical structures preferably have a hollow structure. In this context, a hollow structure implies. a three-dimensional object with an at least partially closed surface, such as, for example, a hollow organ or a correspondingly shaped part of the bony skeleton. Examples of such hollow organs are, for example, the heart or blood vessels. An example of correspondingly shaped parts of the bony skeleton is, for example, a skull.

Furthermore, the method according to according to at least one embodiment of the invention entails the adaptation of a virtual network structure to the spatial course of the anatomical structure. This means that the virtual network structure is modified starting from an initial structure such that it coincides with the course of the surface of the anatomical structure. If it is intended to map specific structures on the surface of the anatomical structure, the virtual network structure has to be adapted such these structures of the network structure to be mapped can subsequently be mapped for image reproduction.

For a subsequent two-dimensional image reproduction of the anatomical structure or of parts of the anatomical structure, the user defines a map projection for the projection of two-dimensional pixel positions of a subsequent output image onto a geometric figure for which mapping onto the two-dimensional space is defined, for example a unit sphere around the center of the anatomical structure, or selects a map projection from a prespecified list of map projections.

It is also possible for a plurality of these map projections to be applied simultaneously to an acquired image dataset in order to obtain two-dimensional output images with different degrees of distortion.

Then, points of intersection of radially extending half lines assigned to the two-dimensional pixel positions of the subsequent output image with the virtual network structure are ascertained. I.e. rays that penetrate the network structure are emitted radially outward from the center of the network structure, which also forms the center of the geometric figure. The piercing points of these rays or half lines are then used as scan points for the subsequent generation of an output image. The orientation of the half lines corresponds to the two-dimensional coordinates of pre-defined points of the output image. These two-dimensional coordinates are transformed into the angular coordinates of the half lines in accordance with the type of map projection selected by the user. Finally, the output image is ascertained on the basis of image intensity values assigned to the ascertained points of intersection. The output image includes a presentation of the anatomical structure projected into the two-dimensional with the aid of the described map projection.

Since users are to select the type of map projection themselves, they are able themselves to determine which properties of the representation are particularly important to them. For example, this can be conformality, a faithful reproduction of distances or equality of area. Two-dimensional representation enables a complex surface of a hollow organ, for example a complex vascular tree structure to be viewed in one glance in order to obtain an overview and detect any anomalies present. Two-dimensional representation can be used as a means for navigation in the originally, acquired three-dimensional image data by clicking on a position of interest in the two-dimensional representation whereupon the corresponding position is automatically displayed in the acquired three-dimensional image data. Two-dimensional representation permits the display of additional information, such as, for example, FFR results (FFR=fractional flow reserve) within this representation thus achieving compact and intuitively readable results documentation.

With the method according to at least one embodiment of the invention for two-dimensional mapping of a tree-like elongated structure of a patient, three-dimensional image data of a tree-like elongated vascular structure of a patient is acquired. In this context, the term "tree-like elongated structure" should be understood to mean a branched, linear structure, for example a branched tubular structure. Such structures can, for example, include vascular structures or structures in the respiratory or digestive tract. In the case of vascular structures, these can include both an arrangement of an individual vessel or a vascular tree and an ensemble of a plurality of vessels or vascular trees. Tree-like elongated structures are then identified on the basis of the acquired three-dimensional image data. Identification of this kind, can, for example, take place by marking positions in the three-dimensional image data at which the tree-like elongated structures were localized.

Furthermore, curved planar reformations are generated for the identified tree-like elongated structures. In this context, reformation should be understood not only as the process of the transformation of the acquired image data into a form that can be represented two-dimensionally, but also the final image resulting thereby. Then, intersecting segments of the structures are rotated such that the segments do not intersect in the curved planar reformation. Finally, there is a unique assignment of a segment of the tree-like elongated structures to each point of an output image from which, in combination with scan lines, an associated scan point of the acquired image data is obtained. Such scan lines are used to scan ambient regions around a course of a tree-like elongated structure. Finally, an output image is generated by scanning the ascertained scan points.

The generation of an output image can, for example, include the representation of a plurality of segments of the tree-like elongated structures in a single image. This method also produces as an output image a two-dimensional image in which the tree-like elongated structures are mapped isometrically with additional context in the case of an elongated curved planar reformation.

Advantageously, this type of mapping obtains a non-schematic representation of tree-like elongated structures that is free of typical artifacts, such as those that occur, for example, with representations based on spherical projections. This type of representation in particular minimizes distortion and there is a loss of information, such as occurs, for example, with projections onto a sphere. Particularly advantageously, with this method, individual vascular segments are not represented separately, but visualized jointly so that mapping of a tree-like elongated structure with a plurality of segments is obtained. This type of representation makes it easy to navigate back and forth along the elongated structures between segments since branching points are also visualized in the image representation and are not lost.

With the method according to at least one embodiment of the invention for simultaneous mapping of a tree-like elongated structure, the tree-like elongated structure is represented using the method according to at least one embodiment of the invention for two-dimensional mapping of anatomical structures of a patient and by simultaneous representation of the tree-like elongated structure using the method according to the invention for two-dimensional mapping of a tree-like elongated structure of a patient.

The apparatus according to at least one embodiment of the invention for two-dimensional mapping of anatomical structures of a patient comprises an input interface for the acquisition of three-dimensional image data of anatomical structures of a patient. For the reception of the image data, the input interface can, for example, be connected to an imaging medical device, such as, for example, a computed tomography system or a magnetic resonance tomography system. The input interface can also be connected to a data network into which a medical imaging device is integrated.

The image data can also be buffered in advance in a database of the data network and, for further processing by the apparatus according to the invention for two-dimensional mapping of anatomical structures of a patient, transmitted by the database to the apparatus according to the invention.

Another part of the apparatus according to at least one embodiment of the invention is an adaptation unit for the adaptation of a virtual network structure to the spatial course of the anatomical structures. The adaptation unit performs calculations in order to adapt an initial network to the shape and course of any relevant detailed structures of the anatomical structures that may be present, such as, for example, vessels, in particular blood vessels. Moreover, the apparatus according to the invention also includes a projection-definition unit for the definition of a user-defined map projection for the projection of two-dimensional pixel positions of a subsequent output image onto a geometric figure for which mapping onto the two-dimensional space is defined, for example a unit sphere, around the center of the anatomical structures. The definition or selection of the desired map projection can, for example, be performed by a user, however, it can also be ascertained automatically or semi-automatically in dependence on the position of detailed structures of interest, such as, for example, blood vessels. Herein, it is possible, for example, in dependence on the location and course of these detailed structures, for a map projection to be selected with which these detailed structures have particularly low distortion or are particularly easy to identify.

The apparatus according to at least one embodiment of the invention, furthermore comprises a point-of-intersection-ascertaining unit for the ascertainment of points of intersection of the radially extending half lines assigned to the two-dimensional pixel positions of the subsequent output image with the virtual network structure. The points of intersection are obtained from a system of equations mathematically describing both the course of the radially extending half lines and the virtual network structure. In addition, the apparatus according to the invention includes an image-generating unit for the ascertainment of the output image on the basis of image intensity values assigned to the ascertained points of intersection. The image intensity values can be read from the image data acquired by the input interface at the position of the ascertained points of intersection.

The apparatus according to at least one embodiment of the invention for two-dimensional mapping of tree-like elongated structures of a patient comprises an input interface for the acquisition of three-dimensional image data of a tree-like elongated structure of a patient. Another part of the apparatus according to the invention for two-dimensional mapping of tree-like elongated structures of a patient is an identification unit for the identification of tree-like elongated structures on the basis of the acquired three-dimensional image data. Another part of the apparatus according to the invention is a reformatting unit for the ascertainment of curved planar reformations for the tree-like elongated structures.

Moreover, the apparatus according to at least one embodiment of the invention also includes a rotation unit for the rotation of intersecting segments of the tree-like elongated structure such that the segments in the curved planar reformation do not intersect.

Another part of the of apparatus according to at least one embodiment of the invention for two-dimensional mapping of tree-like elongated structures of a patient is a scanning unit for the unique assignment of a segment of the tree-like elongated structure to each point of an output image from which, in combination with scan lines, an associated scan point of the acquired image data is obtained and for the generation of an output image by scanning the ascertained scan points.

The components of the named apparatuses according to at least one embodiment of the invention can be predominantly embodied in the form of software components, executed by at least one processor. This relates in particular to the adaptation unit, the projection-definition unit, the point-of-intersection-ascertaining unit and the image-generating unit of the apparatus according to at least one embodiment of the invention for two-dimensional mapping of anatomical structures of a patient. This also relates to the identification unit, the reformatting unit, the rotation unit and the scanning unit of the apparatus for two-dimensional mapping of tree-like elongated structures of a patient.

However, in principle these components can also, to some extent, in particular where particularly fast calculations are involved, be implemented in the form of software-supported hardware, for example FPGAs or the like. Likewise, the required interfaces can, for example if this only involves a transfer from other software components, also be embodied as software interfaces. However, they can also be embodied as hardware-based interfaces controlled by suitable software.

A largely software-based implementation has the advantage that control devices or evaluation devices of imaging medical devices already previously in use can be upgraded in a simple manner via a software update in order to operate in the manner according to at least one embodiment of the invention.

In this respect, at least one embodiment is also achieved by a corresponding computer program product with a computer program which can be loaded directly into a storage device of an imaging medical device with program sections for carrying out all the steps of the method according to at least one embodiment of the invention when the program is executed in the imaging medical device. In addition to the computer program, a computer program product of this kind can optionally also include additional parts such as, for example, documentation and/or additional components and also hardware components, such as, for example, hardware keys (dongles etc.) for using the software.

Transportation to the medical imaging device and/or storage on or in the in the medical imaging device can take place by way of a computer-readable medium, for example a memory stick, a hard disk or another kind of transportable or integrated data carrier on which the program sections of the computer program which can be read-in and executed by a computing are stored. To this end, the computing unit can, for example, comprise one or more interacting microprocessors or the like.

Further, particularly advantageous embodiments and development of the invention may be derived from the dependent claims and the following description, wherein the independent claims of one claims category can also be developed analogously to the dependent claims of another claims category and their descriptive parts.

In one preferred embodiment of the method according to the invention for two-dimensional mapping of anatomical structures of a patient, the anatomical structures have a hollow organ with blood vessel structures. Advantageously, with the aid of the method according to the invention and also as a result of central projection applied, the blood vessel structures, can be visualized two-dimensionally in their entirety. In particular with the representation of blood vessels, the selection of suitable map projections enables the selection of a map projection representing regions containing blood vessels with a particularly low degree of distortion.

In one particularly preferred embodiment of the method according to the invention for two-dimensional mapping of anatomical structures, initially center lines of the blood vessel structures are ascertained. These center lines enable the course of blood vessel structures to be represented schematically.

With the method according to at least one embodiment of the invention, the adaptation of the virtual network structure to the spatial course of a hollow organ or a hollow structure with blood vessel structures is preferably performed such that the virtual network structure is adapted to the spatial course of the center lines of the blood vessel structures of the hollow organ or the hollow structure. Herein, initially an initial network structure is used that has already been adapted to the coarse outlines of the hollow organ. This initial network structure is then adapted to the finer details, in this case the blood vessel structures. If the initial virtual network structure has already been adapted to the surface on which the blood vessels are located, it is possible to avoid major discontinuities in the network structure in the adaptation of the virtual network structure to the blood vessels. This is associated with lower intensity changes in the output images, which, with conventional procedures in which an initial network structure is formed, for example, by a spherical network, result in artifacts.

In a particularly useful embodiment of the method according to the invention for two-dimensional mapping of anatomical structures, the hollow organ includes the pericardium of a heart. In particular with the visualization of coronary vascular trees, conventional image slices have the problem that they can only be represented in sections. Two-dimensional representation of a virtual network structure adapted to the course of the coronary vascular trees enables these structures to be represented in their entirety.

In one variant of the method according to at least one embodiment of the invention for two-dimensional mapping of anatomical structures, the adaptation of the virtual network structure comprises following steps:
Ascertainment of a virtual network structure, which approximates the pericardium of the heart in the acquired three-dimensional image data,
Cropping the virtual network structure, wherein parts of the virtual network structure that do not include any center lines are discarded,
Smoothing the virtual network structure,
Adaptation of the virtual network structure to the center lines.

The use of an initial virtual network structure that approximates the surface of the heart on which the coronary vascular structures are located to a large extent enables the avoidance of irregularities that could occur with a subsequent adaptation of the virtual network structure to the vascular structures in the case of an initial network structure with a less suitable shape, such as, for example, a sphere.

In a special variant of the method according to at least one embodiment of the invention for two-dimensional mapping of anatomical structures, the center lines include a plurality of center line points and, in the step of the adaptation of the virtual network structure to the center lines, an ARAP network deformation method is performed such that the virtual network structure includes the center line points. The use of ARAP network deformation enables the virtual network structure also to be adapted to complex vascular structures that cannot be acquired with other methods. For example, the ARAP network deformation can also be used to acquire vessels that partially overlap in the direction of the radially extending half lines used for the scanning.

In contrast to conventional methods, the ARAP method ensures that each vascular point of each vessel is cut from the network created.

In a particularly advantageous variant of the method according to at least one embodiment of the invention for two-dimensional mapping of anatomical structures, spherical coordinates assigned to the two-dimensional pixel positions on the geometric figure, for example a unit sphere, are shifted such that image regions of interest lie in regions of the output image with lower geometric distortion.

This procedure is particularly advantageous when the image regions of interest include blood vessel structures to be mapped, in particular coronary vascular structures. For example, it is then possible for vascular sections of interested to be shifted into less distorted regions, thus improving the image quality in the representation of these vascular sections.

In one embodiment of the method according to at least one embodiment of the invention, in a case in which a radially extending half line has a plurality points of intersection with the virtual network structure, the point of intersection with the highest intensity is used as an image point for the output image. Advantageously, this also enables compensation of artifacts that can be caused by irregular surfaces of virtual network structures.

Additionally, at least one image slice and/or at least one MIP image can be ascertained on the basis of sections of the radially extending half lines in one or more predetermined spacing intervals before or after the ascertained points of intersection of the half lines with the virtual network structure. Recording a plurality image slices or MIP images assigned to slices arranged at different distances from the points of intersection enables more image details to be ensured in the representation of the output images than with exclusive representation of the points of intersection of the virtual network structure with the radially extending half lines. Furthermore, this variant also permits a slice-by-slice examination of anatomical structures in the output images, thus enabling combination of the advantages of an overall representation of the anatomical structures and slice-by-slice representation.

It is also possible to generate a plurality of output images using different user-defined map projections on the basis of the same acquired three-dimensional image data. This advantageously enables output images with the emphasis on different properties, such as, for example, conformality, area equality, etc. to be viewed simultaneously.

The output images generated can be used to perform at least one of the following user interactions:

Scrolling through slices of the output image,
Viewing only one specific value range of image intensity values,
Viewing an enlarged or reduced image detail,
Shifting image regions to be viewed,
Varying the slice thickness for image slices, preferably MIP images.

It is, therefore, possible to change representation parameters of the three-dimensional data with the aid of output images such that the representation is adapted to individual requirements.

In one variant of the method according to at least one embodiment of the invention for two-dimensional mapping of tree-like elongated structures of a patient, the identification of tree-like elongated comprises structures comprises the following steps:

Definition of a viewing direction onto the acquired image data,
Ascertainment of center lines for tree-like elongated structures in the acquired image data,
Automatic conversion of the center lines into tree-like elongated structures.

The viewing direction is used to define the direction to be taken by the curved reformation. The center lines of the tree-like elongated structures mark the course of the tree-like elongated structures in space. The conversion of the center lines into tree-like elongated structures includes the combination of individual center lines to form complex structures. Herein, for example in a case in which a plurality tree-like elongated structures are included by the image data, individual center lines are uniquely assigned to the different tree-like elongated structures.

Preferably scan lines are automatically ascertained for each center line point of the reformatted vascular tree structures. The ascertainment of scan lines enables scanning of the environment around each of the center line points.

Preferably, the following steps are performed for the rotation of intersecting segments:

Automatic ascertainment of two-dimensional, cylinder-sector-shaped enclosures for the intersecting segments of the reformatted tree-like elongated structures, wherein the cylinder-sector-shaped enclosures completely enclose a respective segment,
Rotation of the cylinder-sector-shaped enclosures of the segments such that there is no longer any intersection of segments and the cylinder-sector-shaped enclosures thereof.

During the reformation, the scan lines are used to scan or represent regions about a center line of a tree-like elongated structure. With curved reformation, the scan lines extend orthogonally to the defined viewing direction and orthogonally to the orientation of the associated center line. Rotation of the cylinder-sector-shaped enclosures is performed to prevent intersection of individual segments. During the rotation of the cylinder-sector-shaped enclosures, the ascertained scan lines and the image regions present in the cylinder-sector-shaped enclosures are also rotated. In this way, individual segments and the environment thereof are represented correctly, but are rotated such that they do not overlap.

The rotation of the cylinder-sector-shaped enclosures for each reformatted tree-like structure is performed on all segments that overlap. This enables the possibility to be excluded of segments to be mapped overlapping partially, thus resulting in the loss of information in the reformatted representation.

In one embodiment of the method according to the invention for two-dimensional mapping of a tree-like elongated structure of a patient, the following steps are performed for the scanning of the acquired image data of the tree-like elongated structure:

Ascertainment of a distance map for a plurality of image points of an output image, which includes the distance of a respective image point to each adjacent segment,
Automatic acquisition of output image data, wherein the distance map is used to ascertain which segment has the shortest distance to the respective image point to be scanned and the image intensity of a respective image point is ascertained by scanning a reformatted image of this segment.

Advantageously, each image point is scanned only once, not multiple times, with the aid of the distance map. Otherwise, in particular at branches of tree-like elongated structures, multiple scans can occur and these can result in image artifacts in the reformatted representation.

In one variant of the method according to at least one embodiment of the invention for two-dimensional mapping of tree-like elongated structures of a patient, the tree-like elongated structures include two separate vascular tree structures, which correspond to the right and left coronary artery tree of the heart. The method described can be used particularly advantageously with the representation of the coronary arteries since the named vascular structures are particularly heavily branched and, due to the extreme curvature, extend very differently from a plane. Nevertheless, the method according to the invention still enables complete coronary vascular trees to be represented in full thus greatly facilitating navigation in a vascular tree to be assessed.

In one special variant of the method according to at least one embodiment of the invention for two-dimensional mapping of tree-like elongated structures of a patient, the ascertainment of curved planar reformations includes the calculation of curved planar reformations in the defined viewing direction. As already mentioned, the viewing direction defines the direction from which reformation is observed to take place.

Particularly preferably, elongated curved reformation is used as curved reformation.

As already mentioned, elongated curved reformation enables isometric mapping of tree-like elongated structures, in particular vascular structures.

In one embodiment of the method according to at least one embodiment of the invention for two-dimensional mapping of tree-like elongated structures of a patient, a scan width is defined such that the probability of artifacts induced by multiple scanning of the same of the acquired image data is reduced. If the scanning width is selected as suitably narrow about a center line, there is no intersection of scan regions of adjacent vascular structure sections.

The generated two-dimensional output images can, for example, be used to perform at least one of the following user interactions:

Viewing only one specific value range of image intensity values,
Viewing an enlarged or reduced image detail,
Shifting image regions to be viewed.

Since the two-dimensional output images give the user a good overview of the tree-like elongated structures to be viewed more closely, for example vascular tree structures and the properties thereof, they can be used to make decisions with respect to modification of the three-dimensional representations.

The output images can also be used to navigate in the acquired three-dimensional image data. This is particularly easily possible with the generated reformatted representations, since these enable complete vascular trees to be mapped.

It is also possible for additional information including at least one of the following types of information to be represented in the output image:

Manually and/or automatically generated contours,
Network structures and/or marks,
Color overlays representing quantitative data.

The additional information can be useful to the user during navigation and adaptation of the representation of three-dimensional image data to specific requirements.

FIG. 1 shows a flow diagram 100 illustrating a method for two-dimensional mapping of a hollow structure, in this case a heart, of a patient. In the step 1.I, initially three-dimensional image data EBD of the heart of the patient is acquired. The mapping of the heart is primarily intended to represent the coronary vessels in order to visualize them for a medical assessment. The three-dimensional image data EBD is recorded from the patient with the aid of an imaging medical system, for example a computed tomography system. For better representation of the coronary vessels of interest, a contrast medium can be administered before the imaging process and is present in the coronary vessels during the imaging of the heart of the patient.

In the step 1.II, a virtual network structure VN is adapted to the spatial course of the heart or the pericardium structure thereof. Individual substeps for this are illustrated in FIG. 2.

In the step 1.III, a user-defined map projection BKN for the projection of two-dimensional pixel positions of a subsequent output image onto a unit sphere around the center of the pericardium is defined.

In the step 1.IV, points of intersection SN of radially extending half lines assigned to the two-dimensional pixel positions of the subsequent output image with the virtual network structure VN are ascertained.

Finally, in the step 1.V, an output image ABD is ascertained on the basis of image intensity values assigned to the ascertained points of intersection. Individual substeps for the ascertainment of the output image are illustrated in FIG. 3.

FIG. 2 illustrates substeps of the step 1.II in a flow diagram 200. In the step 1.IIa, initially center lines CL of the coronary vessels are ascertained in the acquired image data. Then, in the step 1.IIb a virtual network structure VN is ascertained, which approximates the pericardium of the heart in the acquired three-dimensional image data. Then, in the step 1.IIc, a reduced virtual network structure RVN is generated, wherein parts of the network structure that do not include any center lines of vascular structures are discarded. This restricts the virtual network structure to the regions of the heart occupied by the coronary vessels. Furthermore, in the step 1.IId, the virtual network structure is smoothed in order to avoid artifact representations. Finally, in the step 1.IIe, the virtual network structure is adapted to the center lines and an ARAP network deformation method is performed such that the virtual network structure intersects all center line points.

FIG. 3 illustrates substeps of the step 1.IV in a flow diagram 300. In the step 1.IVa, spherical coordinates assigned to the two-dimensional pixel positions SK on the unit sphere EK are shifted such that image regions of interest lie in regions of the output image ABD with lower geometric distortion. Then, in the step 1.IVb, radial half lines HG extending from the center Z of the virtual network structure VN according to the shifted spherical projections coordinates V-SK in the direction of the virtual network structure VN are generated. In the step 1.IVc, the points of intersection SN of the half lines HG with the virtual network structure VN are ascertained.

FIG. 4 illustrates substeps of the step 1.V in a flow diagram 400. In the step 1.Va, initially, the regions corresponding to the points of intersection SN of the half lines HG with the virtual network structure VN in the acquired image data EBD are scanned or image intensities BI assigned to these points SN, for example grayscale values, are ascertained. In the step 1.Vb, in a case in which a plurality of points of intersection SN were ascertained in the step 1.Va for a half line HG, the point of intersection SN used as an image point BP is the one with the highest image intensity. Then, in the step 1.Vc, image data volumes are scanned along the half lines HG at predetermined intervals I to the point of intersection SN of the half line HG with the virtual network structure VN ascertained as an image point in order to generated so-called MIP images. In these representations, in each case image slices are assigned maximum intensity values contained therein and these maximum values are represented.

FIG. 5 illustrates a virtual network structure with coronary vascular structures. FIG. 5 shows the virtual network structure already in adapted state, i.e., the two coronary trees LCA, RCA are already fully integrated in the virtual network structure. Subregions of the heart, such as, for example, the apex of the heart, that do not contain any coronary vessels have already been cut off. Therefore, the state shown in FIG. 5 approximately corresponds to the situation according to step 1.IIe.

Figure 6:
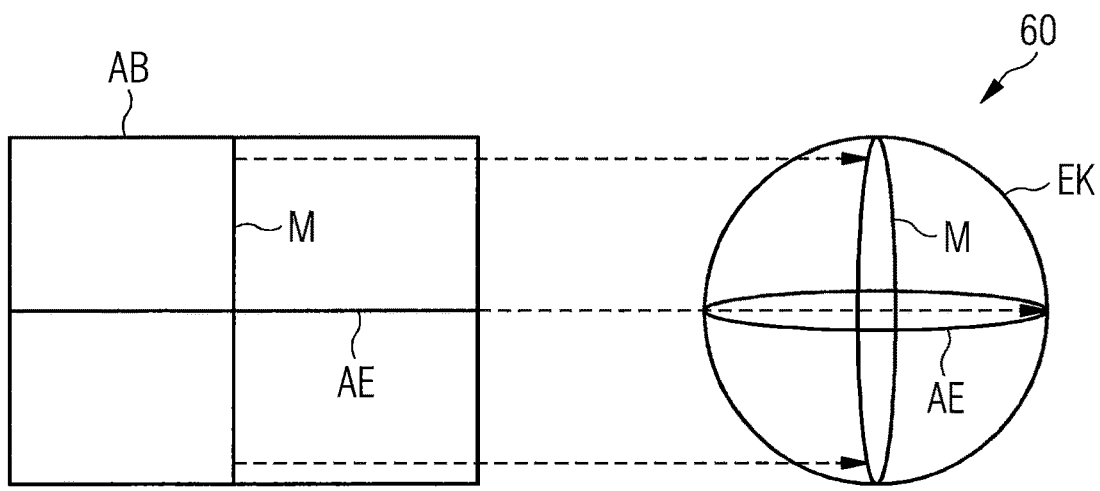
FIG. 6 shows an illustration of a user-defined map projection for the projection of two-dimensional pixel positions of an output image onto a unit sphere around the center of a hollow structure.

FIG. 6 shows, by way of example, a cylinder projection for a user-defined map projection, such as that performed in step 1.III. The left half of the image is a schematic representation of a rectangular two-dimensional output image. The unit sphere with an equator AE and a meridian M is plotted in the right half of the image. The equator AE and the meridian M are also plotted in the representation of the two-dimensional output image. Alternatively, other types of projections between two-dimensional areas and spheres are possible. For example, the two-dimensional output image does not have to be rectangular but can also be elliptical or hexagonal or have another geometric shape.

Figure 7:
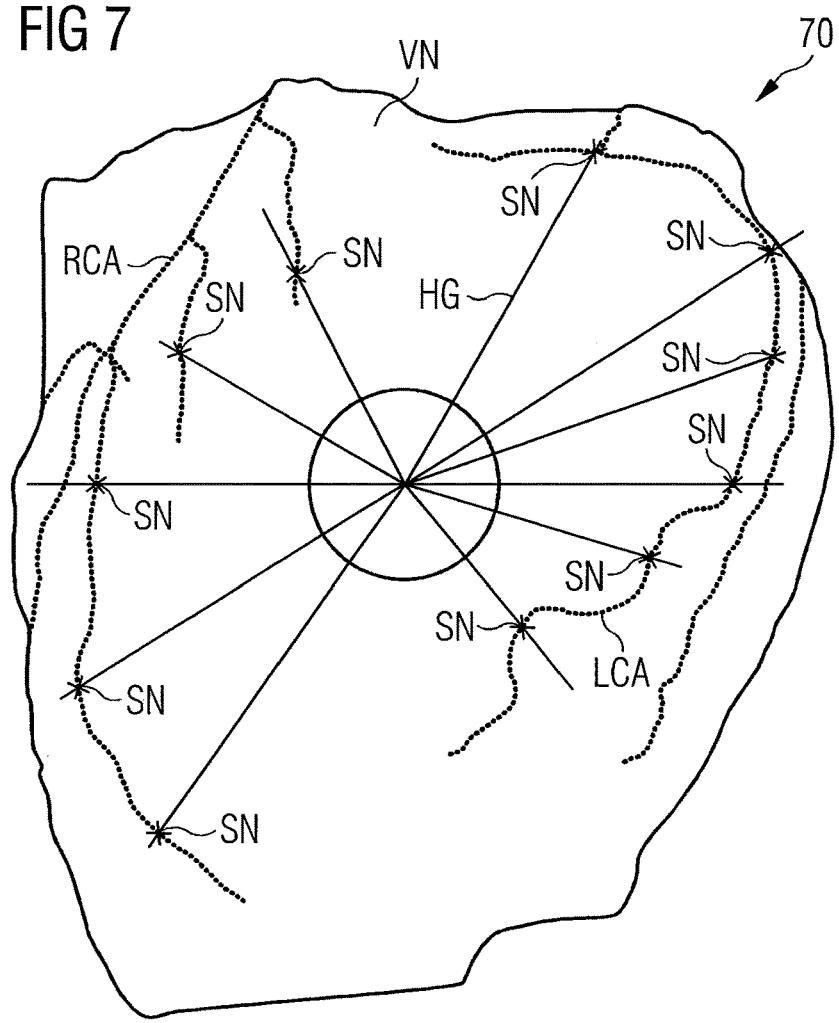
FIG. 7 shows an example representation of an ascertainment of points of intersection of radially extending half lines assigned to the two-dimensional pixel positions of an output image with the virtual network structure.

FIG. 7 is a representation 70 illustrating a procedure corresponding to the steps 1.IVb and 1.IVc. Herein, radial half lines extending from the center of the virtual network structure are generated, wherein the orientation of these half lines HG is defined by the value of the two-dimensional coordinates of the output image illustrated in FIG. 6. The points of intersection SN of the half lines with the virtual network structure VN then form the points at which image intensities are scanned in the acquired image data and used to represent the surface of the heart and in particular the coronary vessels.

Figure 8:
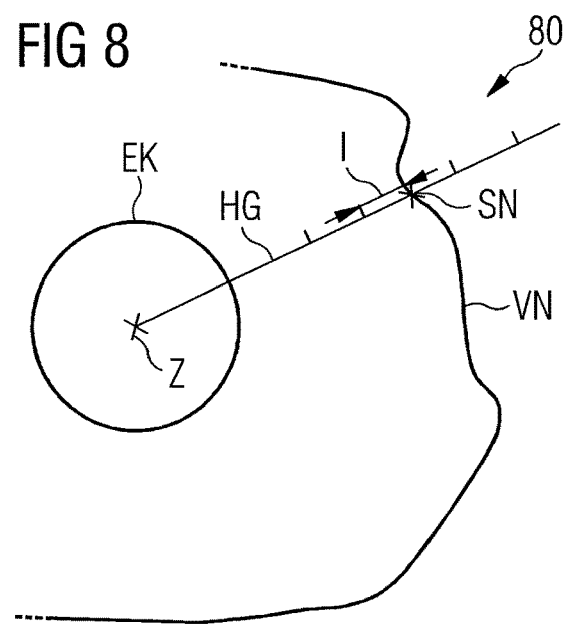
FIG. 8 shows a schematic visualization of a cross section of an anatomical structure illustrating the ascertainment of further additional MIP images.

FIG. 8 shows a schematic representation 80 of a cross section of a virtual network structure VN. The cross-sectional representation is to illustrate the step 1.Vc in which image data volumes are scanned along the half lines HG at predetermined intervals I to the point of intersection SN of the half line HG ascertained as an image point with the virtual network structure VN in order to generate a so-called MIP image MIP. With this kind of representation, predefined sections of the half lines HG are scanned, i.e. the image intensities assigned to these sections, such as, for example, grayscale values, are acquired and then the maximum intensity value found in such an interval is used for slice-by-slice image representation.

Figure 9:
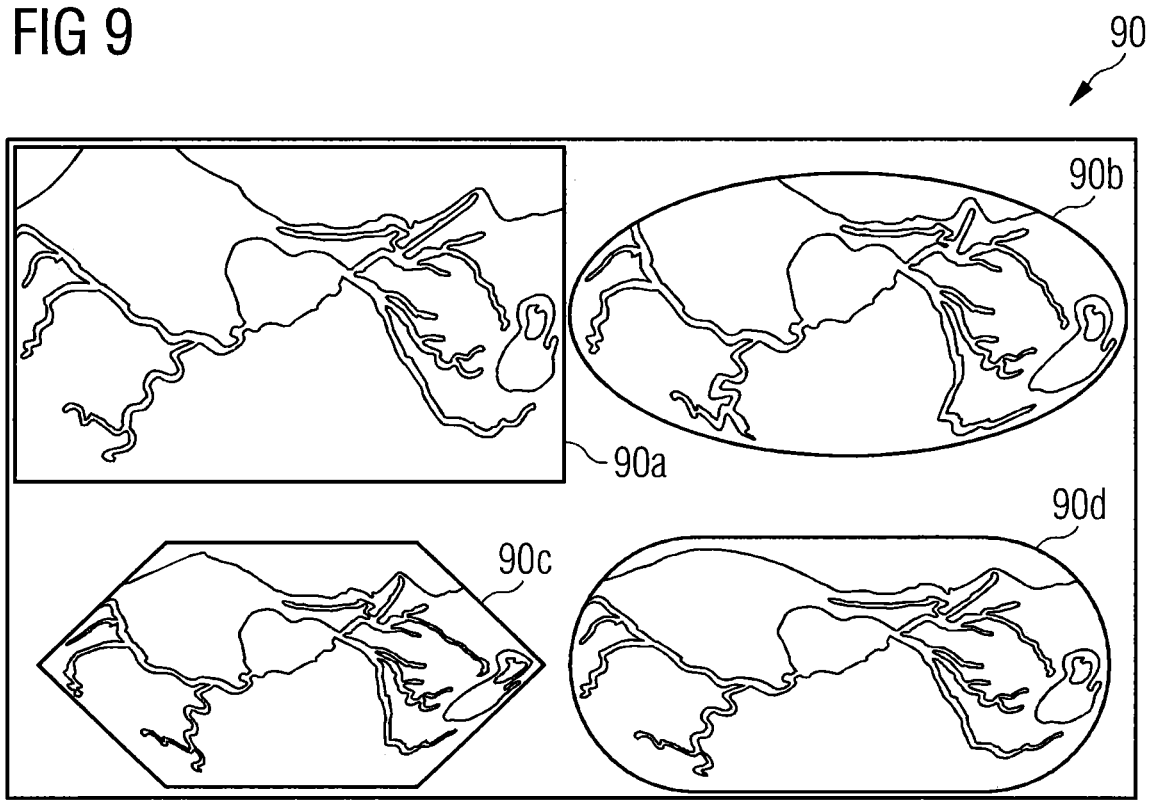
FIG. 9 shows a schematic representation of two-dimensional images of coronary vascular structures, which were generated with the aid of a method for two-dimensional mapping of a hollow structure of a patient according to an example embodiment of the invention.

FIG. 9 shows a representation 90 of differently shaped two-dimensional output images 90a, 90b, 90c, 90d. The output image 90a shown on the top left has a rectangular shape and was, for example, recorded with the aid of a cylinder projection as a map projection. The output image 90b represented on the top right has elliptical shape. Such a projection can, for example, be obtained by azimuthal projection. The output image 90c on the bottom left has a hexagonal shape and the output image 90d on the bottom has a shape formed from a combination of a rectangle and two semicircles attached to the narrow sides of the rectangle. In particular in the edge region, different projections have different geometric properties.

Figure 10:
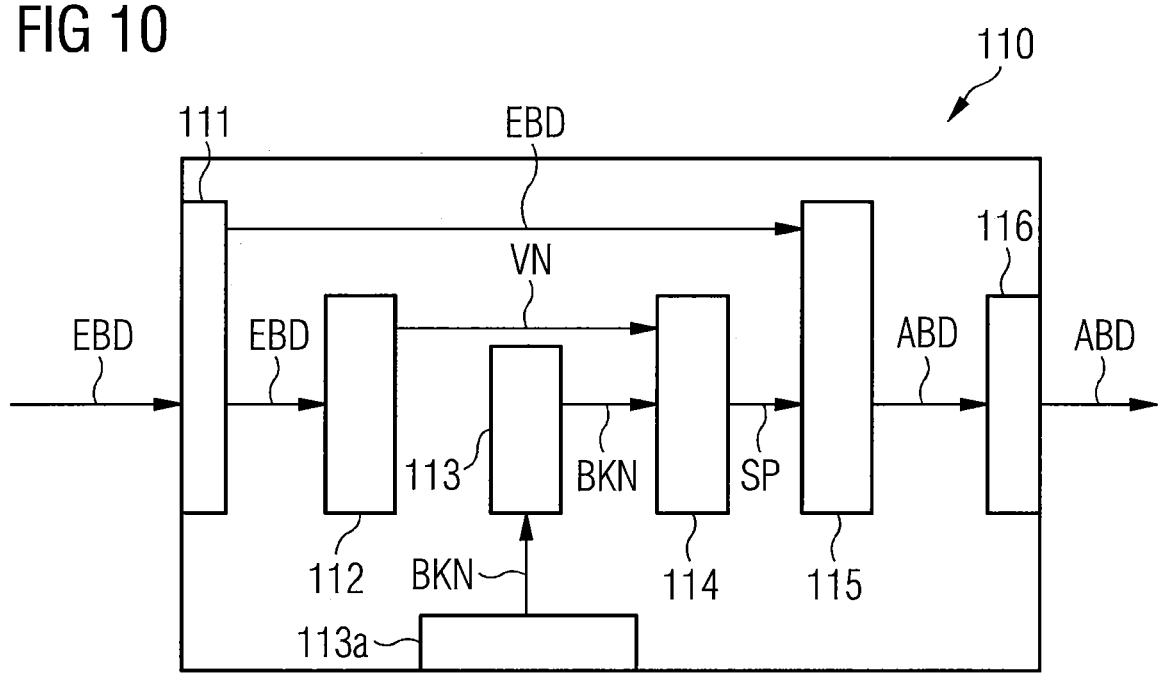
FIG. 10 shows a schematic representation of an apparatus for two-dimensional mapping of a hollow structure of a patient according to an example embodiment of the invention.

FIG. 10 is a schematic representation of an apparatus 110 for two-dimensional mapping of a hollow structure of a patient. The apparatus 110 includes an input interface 111 for the acquisition of three-dimensional image data as input image data EBD of a hollow structure of a patient. The acquired three-dimensional image data EBD is then transmitted to an adaptation unit 112, which adapts a virtual network structure VN to the spatial course of the hollow structure. The adaptation process is performed as described in connection with FIG. 2. A user uses a projection-definition unit 113 to define a type BKN of map projection for the projection of two-dimensional pixel positions of a subsequent output image onto a unit sphere around the center of the hollow structure. For this, the user inputs selection data relating to the type of map projection BKN to be used via a user input interface 113a. The defined projection type and the adapted virtual network structure VN are used by a point-of-intersection-ascertaining unit 114 as the basis for ascertaining points of intersection SN of radially extending half lines HG assigned to two-dimensional pixel positions of the subsequent output image ABD with the virtual network structure VN. The ascertained points of intersection SN are transmitted to an image-generating unit 115, which generates an output image ABD on the basis of the ascertained points of intersection SN and image intensity values assigned to the input image data EBD. Finally, the output image ABD is output via an output interface 116. The output image ABD can, for example, be displayed directly on an image display unit of a medical imaging system or also forwarded to an image store or a database.

FIG. 11 shows a flow diagram 1100 illustrating a method for two-dimensional mapping of a vascular structure of a patient according to an example embodiment of the invention. While the method illustrated in connection with FIG. 1 to FIG. 9 enables a conformal representation of coronary arteries in the case of the choice of a user-defined conformal map projection BKN, coronary arteries are mapped isometrically with the aid of the method illustrated in FIG. 11. Unlike the case with the method illustrated in connection with FIG. 1 to FIG. 9, with the method illustrated in FIG. 11, instead of an overall representation of the coronary region, the individual coronary trees and the sections thereof are addressed and these are illustrated in detail together with their immediate environment with the aid of a method based on curved planar reformation (CPR). Similarly to the methods illustrated in FIG. 1 to FIG. 9, there is a two-dimensional representation of the coronary vessels.

In the example embodiment illustrated in FIG. 11, in the step 11.I, three-dimensional image data EBD of the heart of a patient are acquired. The three-dimensional image data is recorded from the patient with the aid of an imaging medical system, for example a computed tomography system. For better representation of the coronary vessels of interest, a contrast medium can be administered before the imaging process and is located in the coronary vessels during the imaging of the heart of the patient. In the step 11.II, vascular tree structures GBS are identified on the basis of the acquired three-dimensional image data EBD. Furthermore, in the step 11.III, curved planar reformation CPR is applied to the two vascular tree structures GBS identified. In the step 11.IV, opposite vascular segments that intersect are rotated such that the rotated vascular segments then no longer intersect. In the step 11.V, a distance map AK is automatically ascertained for each point of an output image ascertained, which represents the distance of this point from each of the vascular branches in its vicinity. The point spacing can be understood as a segment of a distance line between the point and a respective center line. In the step 11.VI, the user then defines the scan width ATB, i.e. the width, in which the context about a center line in the output image ABD is visually represented. Finally, in the step 11.VII, automatic scanning of the acquired image data EBD is performed for each vascular tree structure GBS within the boundaries defined by the scan width. Herein, the distance map AK is used to identify which vascular segment has the shortest distance to the respective point to be scanned. Then, the image intensity of the respective point is ascertained by scanning the image data EBD of the ascertained vascular segment.

FIG. 12 represents a flow diagram 1200 illustrating substeps of the step 11.II shown in FIG. 11. In the step 11.IIa, a viewing direction BR is defined that appears most favorable for the user and represents the projection direction in the subsequent curved planar reformation. Furthermore, in the step 11.IIb center lines CL of vascular structures are ascertained. The center lines identify the course of individual sections of the vascular structures. Then, in the step 11.IIc, the ascertained center lines CL are automatically combined to form vascular tree structures GBS. For example, all the center lines forming the left coronary artery are combined to form a vascular tree structure GBS of the left coronary artery LCA and all the center lines CL forming the right coronary artery RCA are combined to form a vascular tree structure GBS of the right coronary artery RCA. The combination of the center lines CL can, for example, on the basis of an existing model of the position course of the two coronary arteries and in dependence on which center lines touch each other or are at least very close to each other.

FIG. 13 represents a flow diagram 1300 illustrating substeps of the step 11.IV shown in FIG. 11 in detail. In the step 11.IVa, initially, scan lines AL for each center line point of the reformatted vascular tree structures GBS are automatically generated. These scan lines AL are arranged orthogonally to the orientation of the center lines CL and orthogonally to the viewing direction BR. These scan lines AL are assigned corresponding positions in three-dimensional space, to be more precise, in the acquired image data EBD. In the step 11.IVb, cylinder-sector-shaped enclosures HE1, HE2, HE3 are automatically ascertained for each of the opposite vascular segments of the reformatted vascular tree structures ascertained, wherein the enclosures completely enclose the respective vascular segment. Then, in the step 11.IVc, the enclosures of the vascular segments for each of the two reformatted vascular tree structures are rotated such that there is no overlapping of adjacent vascular segments and the enclosures thereof.

FIG. 14 illustrates in a schematic representation 140 the vascular tree structures RCA, LCA identified in the step 11.II, which represent the right coronary vascular tree and the left coronary vascular tree of the heart.

Figure 15:
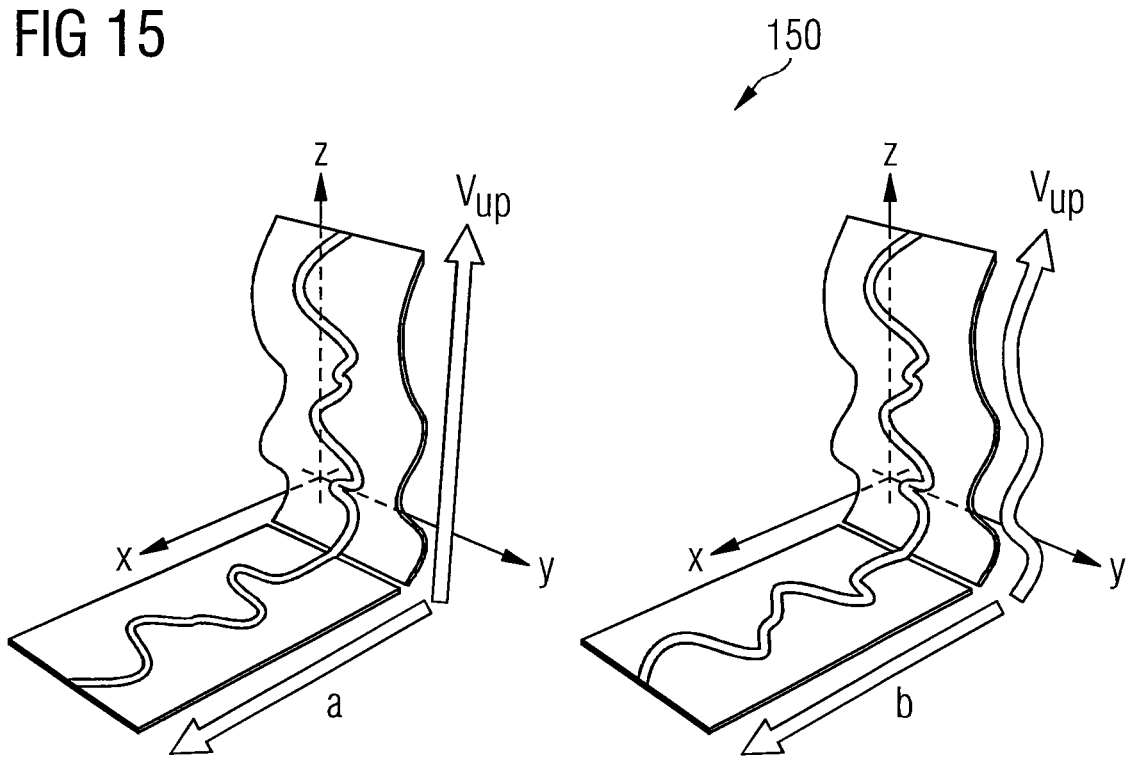
FIG. 15 shows schematic representations of a curved planar reformation and a curved planar elongated reformation.

FIG. 15 shows by way of example in a schematic representation 150 two types of curved planar reformations such as can be applied in the step 11.III. In the two schematic representations, the structures to be reformatted lie in the y-z plane and are mapped in the x-y plane. The left half of the image shows a simple planar reformation in which the scan direction Vup extends parallel to the z-direction. In the case of a course of the center line that is curved in the x-direction, which determines the shape of the area to be scanned, the projected image is clearly compressed in the x-direction or in the direction identified by the vector a. On the other hand, in the case of an elongated curved planar reformation, as shown in the right half of the image in FIG. 15, the projected image is mapped isometrically in x-direction or in the direction identified by the vector b.

Figure 16:
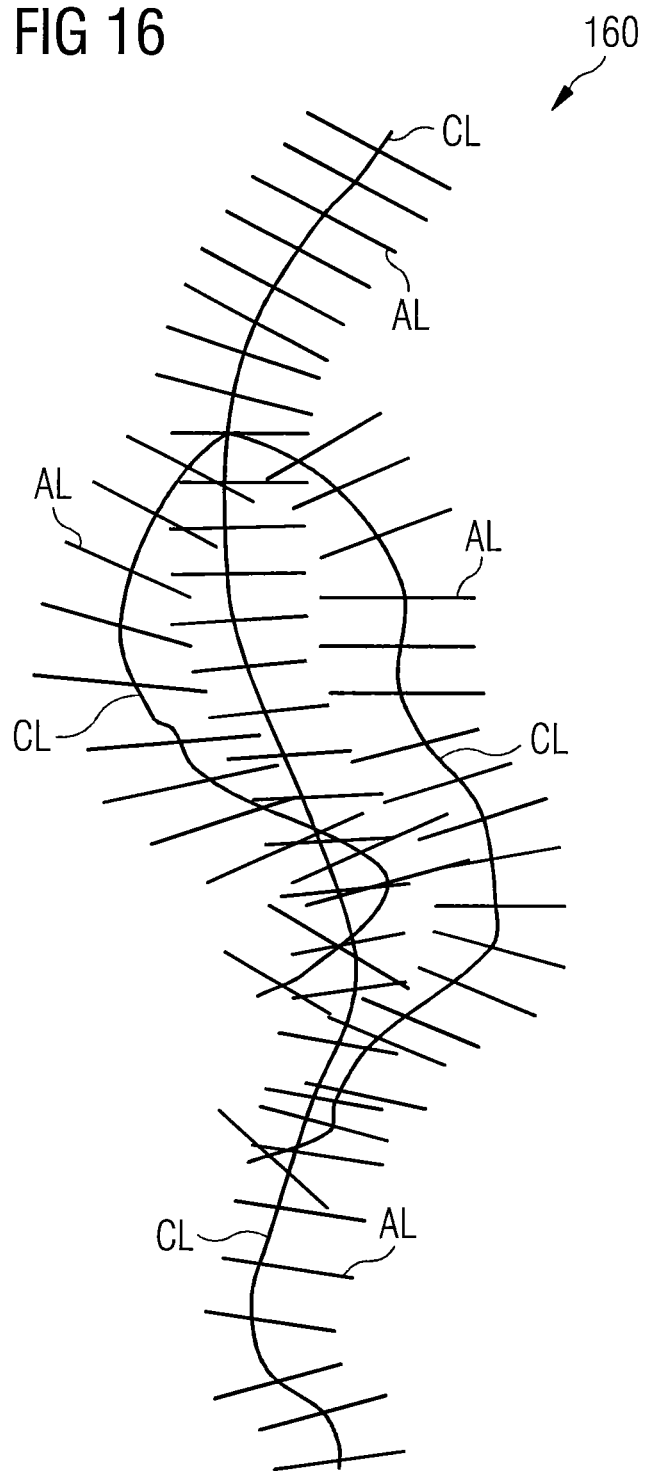
FIG. 16 shows a part of a vascular tree in reformatted form, wherein, additionally, scan lines extending orthogonally to the center lines of the vascular tree are plotted.

FIG. 16 is a schematic representation of a vascular tree section 160, which is represented by branched center lines CL. In order, with a curved planar reformation, also to scan the adjacent region of the center lines CL, as already mentioned in connection with the step 11.IVa, so-called scan lines AL are defined at each center line point. Herein, the scan lines AL are both orthogonal to the viewing direction and orthogonal to the orientation of the center lines CL. The scan lines AL are used to scan points in the acquired three-dimensional image data and transform them into a two-dimensional reformatted format.

Figure 17:
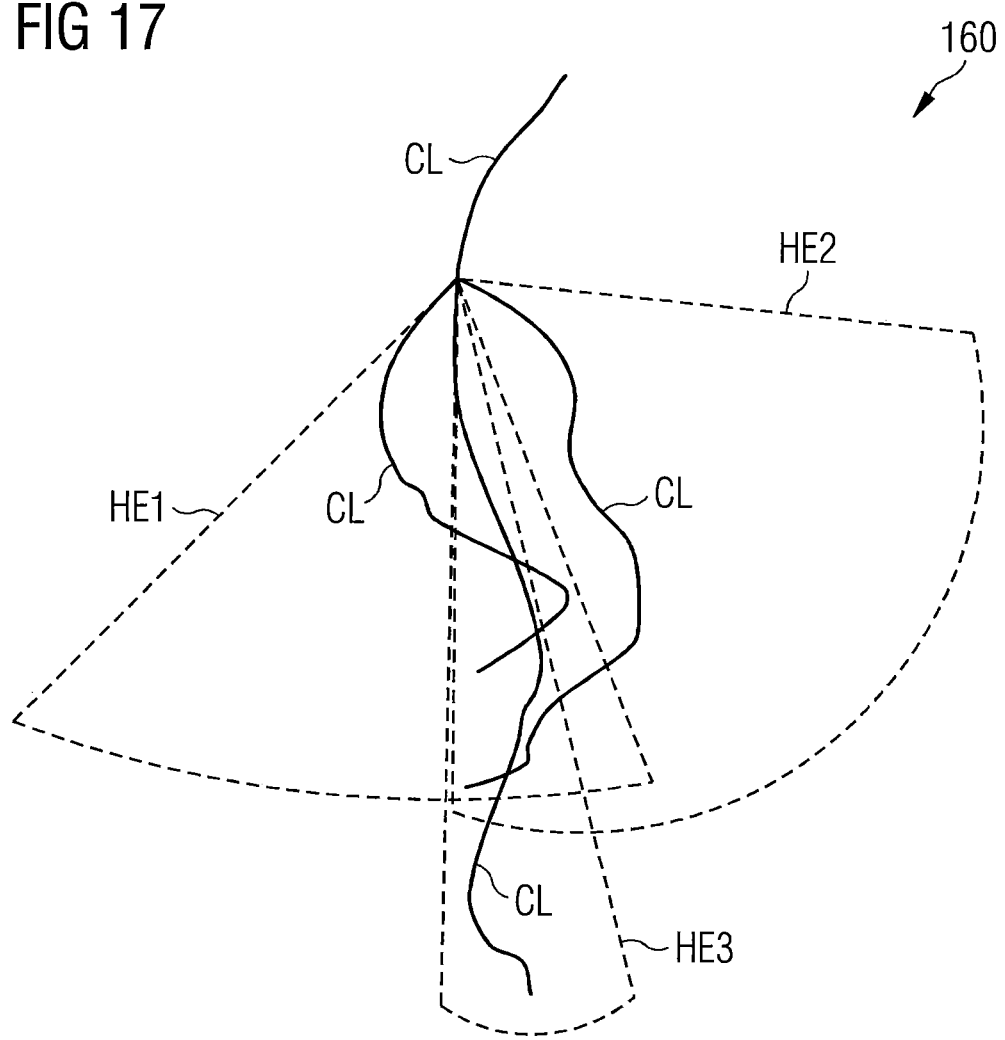
FIG. 17 shows the reformatted part of a vascular tree illustrated in FIG. 16, wherein individual segments embodied as vascular branches with cylinder sectors are represented as enclosing elements.

FIG. 17 shows the vascular tree section 160 illustrated in FIG. 16 without scan lines. The center lines CL that intersect in the viewing direction and the environment thereof are to be represented uncovered in the reformatted two-dimensional representation. For this, cylinder-sector-shaped enclosing elements HE1, HE2, HE3 that completely enclose the individual branches are defined around individual branches of the vascular tree. This process corresponds to the step 11.IVb, which was explained in connection with FIG. 12.

Figure 18:
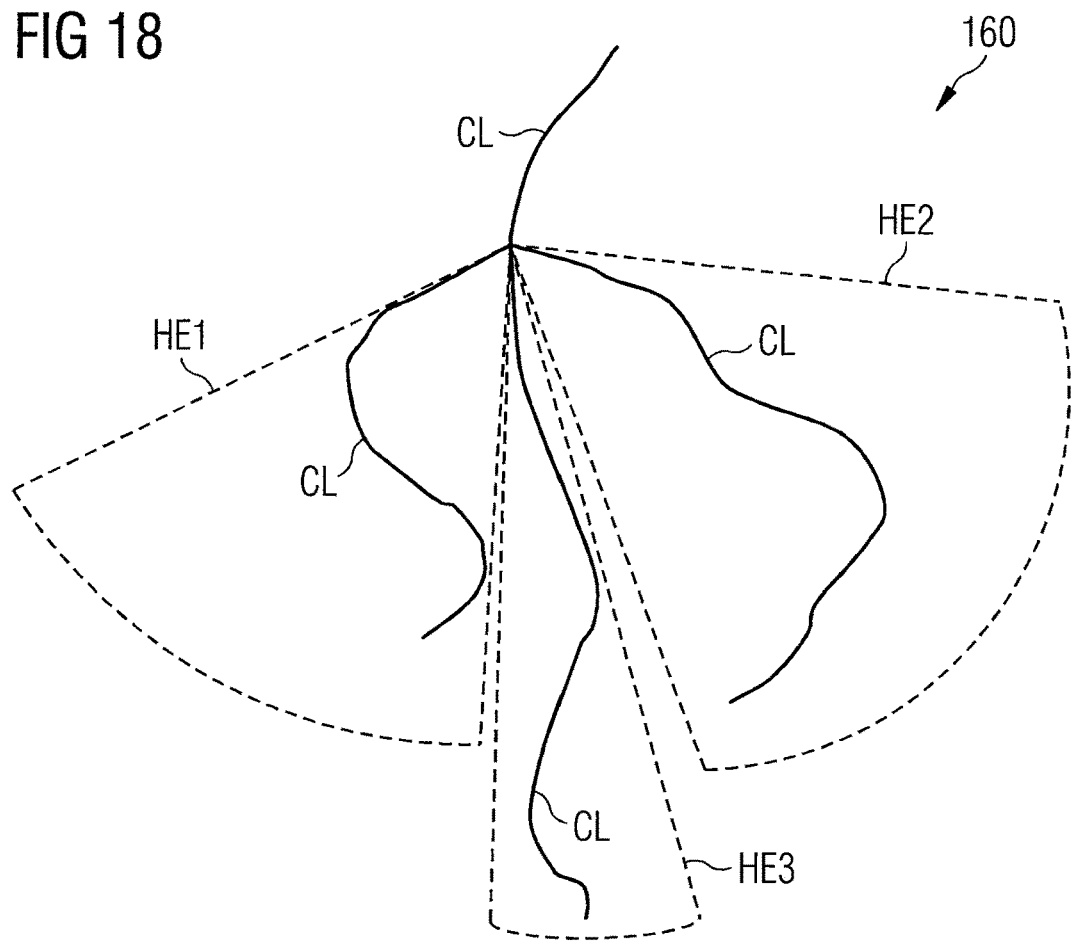
FIG. 18 shows the part of a vascular tree illustrated in FIG. 16 and FIG. 17 after the cylinder sectors have been rotated such that they no longer intersect.

FIG. 18 shows the vascular tree 160 shown in FIG. 16 and FIG. 17 following rotation of the vascular tree branches or the enclosing elements HE1, HE2, HE3 enclosing them. This process corresponds to the step 11.IVc, which was explained in connection with FIG. 12. As a result of the rotation, there is no longer any intersection of the individual branches of the vascular tree 160 so that the branches of the vascular tree no longer conceal one another.

Figure 19:
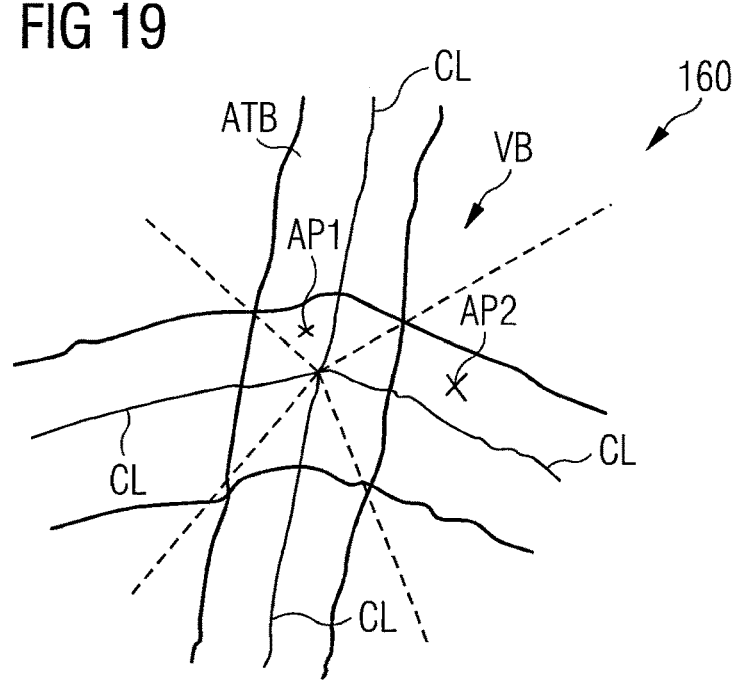
FIG. 19 shows a schematic representation of a branch of a reformatted vascular tree structure showing a distance-dependent assignment of image points to individual segments of the vascular tree structure.

FIG. 19 shows an enlarged section of the of the vascular tree section 160 shown in FIG. 18. In a region VB around the divergence of the center lines CL, hereinafter also called divergence region, scan points AP1, AP2 are assigned to individual branches CL of the vascular tree 160 within a defined scan region ATB. The assignment is performed in dependence on branch CL to which the respective scan point AP1, AP2 is closest. The plotted dashed lines are intended to identify the points that are equidistant to two different branches CL. Assignment to individual branches should avoid duplicate scanning of individual points and the artifacts associated therewith. The procedure described corresponds to the procedure in the steps 11.V, 11.VI and 11.VII.

Figure 20:
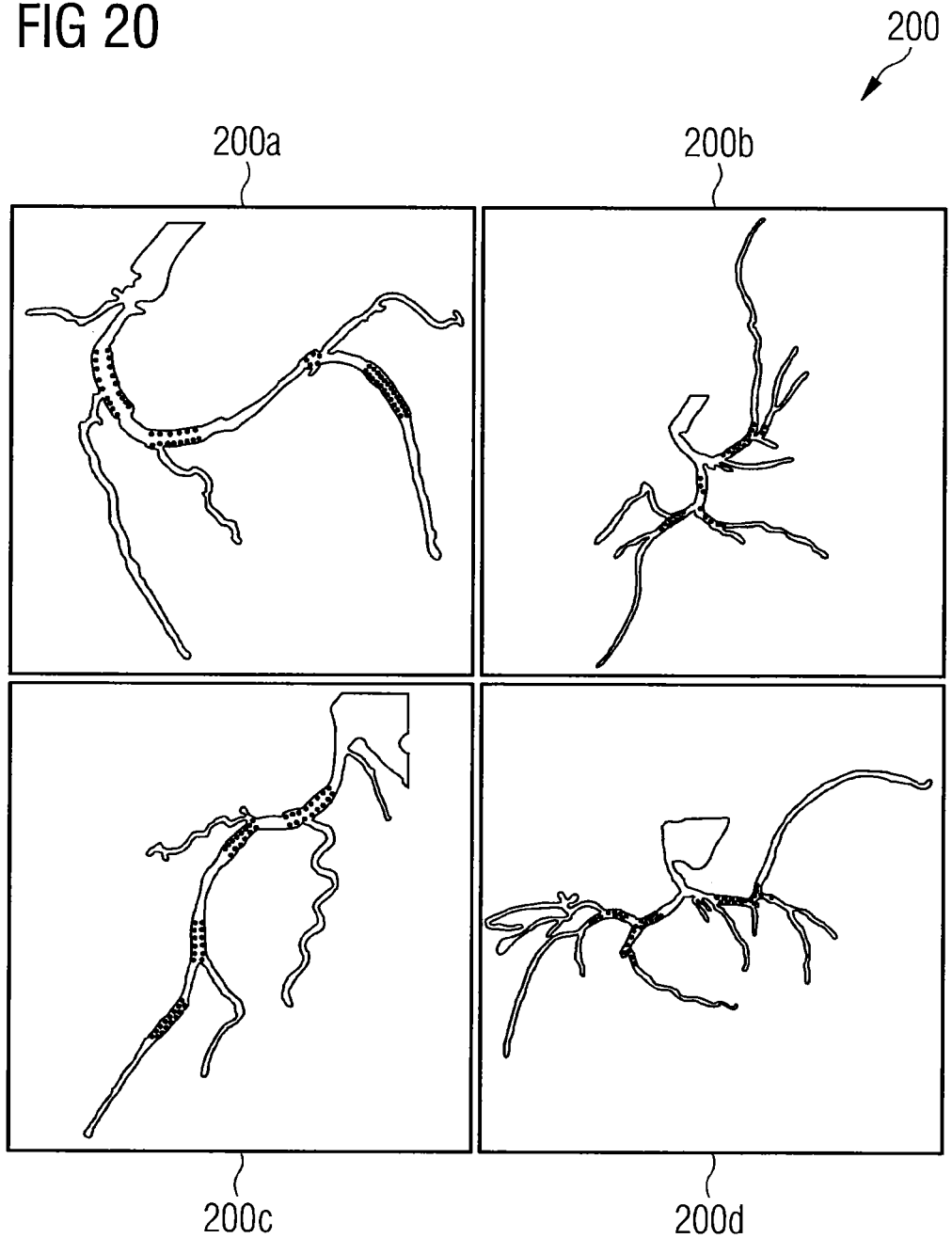
FIG. 20 shows a representation with output images, which were generated with a method for two-dimensional mapping of a vascular structure of a patient according to an example embodiment of the invention.

FIG. 20 shows a representation 200 with output images 200a, 200b, 200c, 200d, which were generated with the method described in connection with FIG. 11 to FIG. 19 for two-dimensional mapping of a vascular structure of a patient. The two representations 200a, 200c shown in the left half of the image show the right coronary artery RCA of a heart and the two representations 200b, 200d shown in the right half of the image show the left coronary artery LCA of this heart. All four representations 200a, 200b, 200c, 200d were generated with the aid of curved planar reformation CPR. The two images 200c, 200d shown in the bottom half of the image have been reformatted from a viewing direction rotated by 90° compared to the images 200a, 200b represented in the upper half of the image visualized. In the two images 200c, 200d shown in the bottom half of the image, more context is shown compared to the images 200a, 200b represented in the upper half of the image visualized. I.e. the region mapped around the center lines of the vascular structures in the images 200c, 200d represented in the bottom half of the image visualized is more extended than it is with the images 200a, 200b represented in the upper half of the image.

Figure 21:
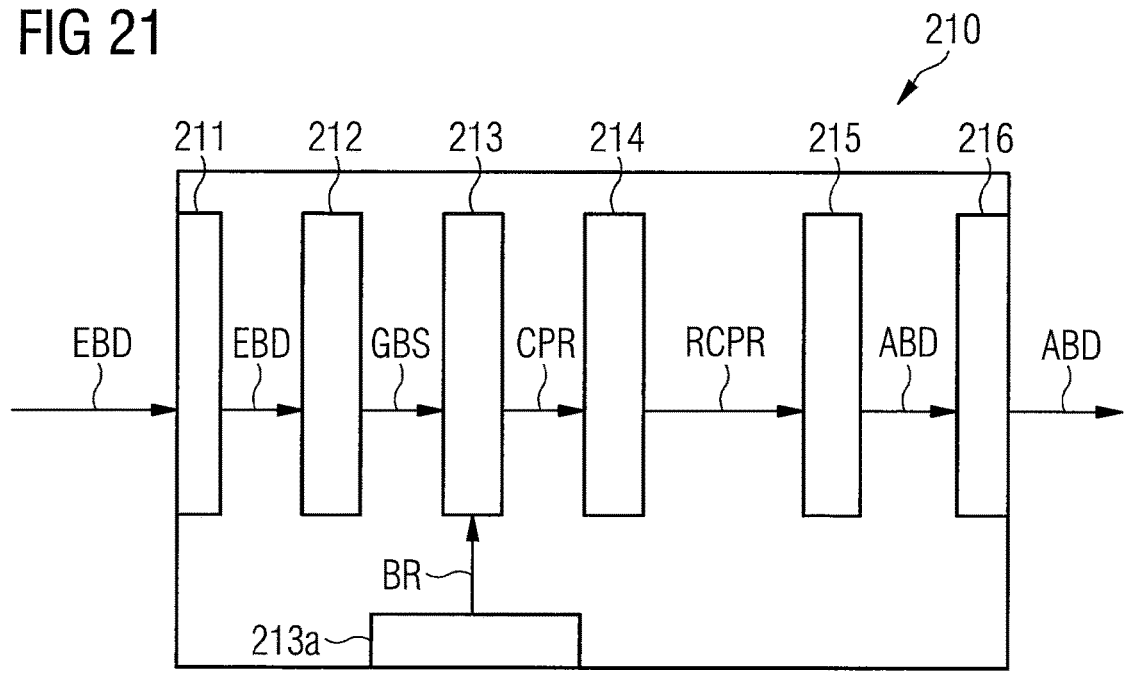
FIG. 21 shows an apparatus for two-dimensional mapping of a vascular structure of a patient according to an example embodiment of the invention.

FIG. 21 shows an apparatus 210 for two-dimensional mapping of a vascular structure of a patient. The apparatus 210 includes an input interface 211 configured to acquire three-dimensional image data EBD from a vascular structure of a patient. The acquired three-dimensional image data EBD is transmitted to an identification unit 212, which identifies vascular tree structures GBS on the basis of the acquired three-dimensional image data EBD. The identified vascular tree structures are transmitted to a reformatting unit 213, which generates curved planar reformations CPR for each of the vascular tree structures GBS. The viewing direction BR of the acquired three-dimensional image data EBD used for the reformations CPR can be defined by the user. For this, the user inputs a desired viewing direction BR via a user input interface 213a with which the corresponding reformatted vascular segment images CPR are then generated by the reformatting unit 213.

The reformatted images CPR are then transmitted to a rotation unit 214 that rotates intersecting vascular segments such that these vascular segments do not intersect in the curved planar reformation CPR. The reformatted images RCPR generated thereby are transmitted to a scanning unit 215 that scans the reformatted images RCPR such that each scan point is uniquely assigned to a single vascular segment of the vascular tree structure GBS. I.e. each scan point is only assigned to precisely one reformatted vascular segment. An output image ABD generated during the scanning is then output via an output interface 216.

Figure 22:
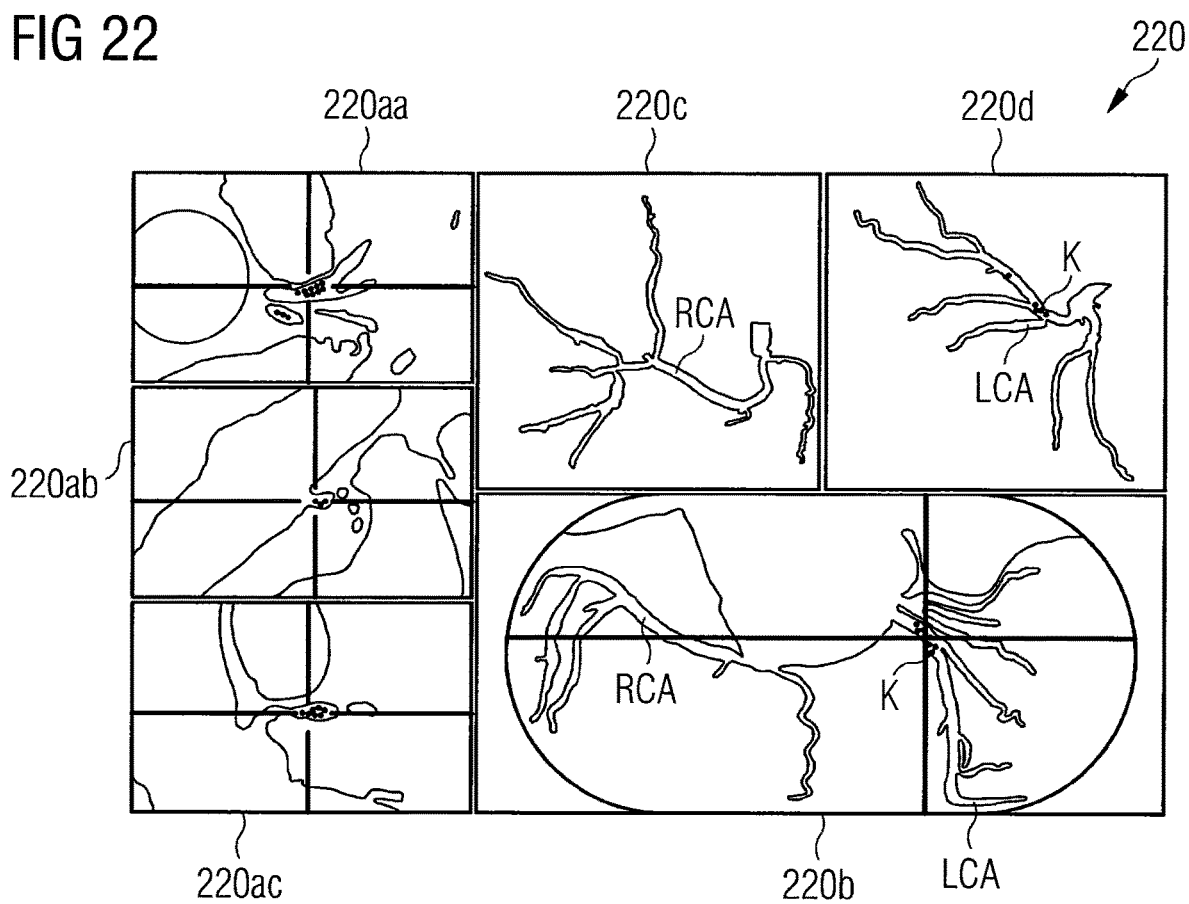
FIG. 22 shows simultaneous imaging of coronary vessels of a heart, wherein representations of three-dimensional image data are combined with two-dimensional image data, which was generated with a method for two-dimensional mapping of a hollow structure of a patient according to an example embodiment of the invention and with a method for two-dimensional mapping of a vascular structure of a patient according to an example embodiment of the invention.

FIG. 22 illustrates a simultaneous representation 220 of images of coronary vessels of a heart. The different images represented in FIG. 22 were all generated on the basis of a common, i.e. one and the same, set of three-dimensional image data. Such representations can, for example, be shown on an image display unit of a medical imaging system. The three image representations 220aa, 220ab, 220ac in the left third of the image show conventional image representations of image slices, so-called multiplanar reformatted images, which were compiled with the aid of multiplanar reformation. These images 220aa, 220ab, 220ac were recorded from three different viewing directions that were orthogonal to one another. The different views are image slices that do not permit complete representation of curved objects, such as, for example, a coronary tree. The image 220b represented at the bottom right corresponds to an image generated with the aid of the method illustrated in connection with FIG. 1 to FIG. 10 for two-dimensional mapping of a hollow structure of a patient. This mapping 220b shows both vascular trees RCA, LCA in a two-dimensional representation. In this representation, it is easy to identify calcification K in the left coronary artery LCA.

Advantageously, due to the complete representation 220b of the coronary vessels, this calcification is easier to identify than in the slice-by-slice representations 220aa, 220ab, 220ac. Moreover, this type of visualization has the advantage that it is easy to assign the calcification K to a specific vascular segment. Two-dimensional representation 220b is substantially conformal so that the coronary vessels are substantially represented true to nature and a user finds it easier to deal with them than with an image slice representation or an image representation 220c, 220d generated with the aid of a curved planar reformation, as shown on the top right in FIG. 22.

The two coronary vessels RCA, LCA represented at the top right were generated with the aid of the method for two-dimensional mapping of a vascular structure of a patient, which was illustrated in connection with FIG. 11 to FIG. 20.

The two representations 220c, 220d map the coronary vessels RCA, LCA isometrically. Thus, the mapping 220d of the left coronary artery LCA can be used to ascertain the location of the calcification in the orientation of the corresponding branch of the left coronary artery. If the position of the calcification is now selected in one of the reformatted representations 220b, 220d, the corresponding three-dimensional position is automatically displayed in the image slice representation 220aa, 220ab, 220ac in the left third of the image so that the user also finds the sought-for calcification in the conventional image slice representation. Advantageously, simultaneous representation of the two different two-dimensional mappings of the coronary vessels provides the user with mutually complementary information that makes it easier to deal with the acquired image data.

Finally, reference is made once again that the methods and devices described above in detail are example embodiments only and the basic principle can also be varied in wide ranges by the person skilled in the art without departing from the scope of invention insofar as this is specified by the claims. For purposes of completeness, it is also pointed out that the used of the indefinite article "a" or "an" does preclude the possibility of the features in question also being present on a multiple basis. Similarly, the term "unit" does not preclude the possibility of this comprising a plurality of components that can optionally also be spatially separated from one another.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for two-dimensional mapping of anatomical structures of a patient, comprising:
    acquiring three-dimensional image data of anatomical structures of a patient;
    adapting a virtual network structure to a spatial course of the anatomical structures;
    defining a user-defined map projection for projection of two-dimensional pixel positions of an image to be output onto a geometric figure around a center of the anatomical structures for which mapping onto a two-dimensional space is defined;
    ascertaining points of intersection of radially extending half lines assigned to the two-dimensional pixel positions of the image to be output with the virtual network structure; and
    ascertaining the image to be output based upon image intensity values assigned to the points of intersection ascertained.

2. The method of claim 1, wherein the anatomical structures have a hollow structure.

3. The method of claim 2, wherein the hollow structure includes a hollow organ with blood vessel structures.

4. The method of claim 3, wherein center lines of the blood vessel structures are ascertained and wherein the adapting includes adapting of the virtual network structure to the spatial course of the hollow organ such that the virtual network structure is adapted to the spatial course of the center lines of the blood vessel structures.

5. The method of claim 3, wherein the hollow organ includes a pericardium of a heart.

6. The method of claim 5, wherein the adapting of the virtual network structure comprises:
    ascertaining a virtual network structure, approximating the pericardium of the heart in the three-dimensional image data acquired,
    cropping the virtual network structure, wherein parts of the virtual network structure not including any center lines are discarded,
    smoothing the virtual network structure, and
    adapting the virtual network structure to the center lines.

7. The method of claim 6, wherein the center lines include a plurality of center line points and, in the adapting of the virtual network structure to the center lines, an ARAP network deformation method is performed such that the virtual network structure includes the center line points.

8. The method of claim 1, wherein spherical coordinates assigned to the two-dimensional pixel positions are shifted on the geometric figure such that image regions of interest lie in regions of the image to be output with lower geometric distortion.

9. The method of claim 8, wherein the image regions of interest include blood vessel structures to be mapped.

10. The method of claim 1, wherein, upon a radially extending half line including a plurality points of intersection with the virtual network structure, a point of intersection with a highest intensity is used as an image point for the image to be output.

11. The method of claim 1, wherein at least one of at least one additional image slice and at least one additional MIP image are ascertained in the ascertaining, based upon sections of the radially extending half lines in a spacing interval with respect to points of intersection of the half lines with the virtual network structure ascertained.

12. The method of claim 1, wherein a plurality of images to be output are generated using different user-defined map projections based upon same three-dimensional image data acquired.

13. The method of claim 1, wherein the image to be output is output as an output image and wherein the output image is used to carry out at least one user interaction including:
    scrolling through slices of the output image,
    viewing only one specific value range of image intensity values,
    viewing an enlarged or reduced image detail,
    shifting image regions to be viewed,
    varying slice thickness for image slices.

14. A non-transitory computer program product storing a computer program, directly loadable into a storage device of a control device of a medical imaging system, including program sections for carrying out the method of claim 1 when the computer program is executed in the control device of the medical imaging system.

15. A non-transitory computer-readable medium storing program sections, readable-in and executable by a computing unit to carry out the method of claim 1 when the program sections are executed by the computing unit.

16. The method of claim 4, wherein the hollow organ includes a pericardium of a heart.

17. The method of claim 16, wherein the adapting of the virtual network structure comprises:
    ascertaining a virtual network structure, approximating the pericardium of the heart in the three-dimensional image data acquired,
    cropping the virtual network structure, wherein parts of the virtual network structure not including any center lines are discarded,
    smoothing the virtual network structure, and
    adapting the virtual network structure to the center lines.

18. The method of claim 17, wherein the center lines include a plurality of center line points and, in the adapting of the virtual network structure to the center lines, an ARAP network deformation method is performed such that the virtual network structure includes the center line points.

19. The method of claim 1, further comprising:
    outputting the image to be output.

20. A method for simultaneous mapping of a tree-like elongated structure, comprising:
    representing the tree-like elongated structure using the method of claim 2; and
    simultaneously representing the tree-like elongated structure using a method including
        acquiring three-dimensional image data of the tree-like elongated structure of a patient,
        identifying the tree-like elongated structure based upon the three- dimensional image data acquired,
        ascertaining curved planar reformations for the tree-like elongated structure identified,
        rotating intersecting segments of the tree-like elongated structure such that the segments do not intersect in the curved planar reformations ascertained,
        assigning, uniquely, a segment of the tree-like elongated structure to each point of an image to be output from each of which, in combination with scan lines, an associated respective scan point of the three-dimensional image data is obtained, and
        scanning the associated respective scan points obtained to generate the image to be output.

21. An apparatus for two-dimensional mapping of a tree-like elongated structure of a patient, comprising:
    an input interface for acquisition of three-dimensional image data of a tree-like elongated structure of a patient;
    an identification unit for identification of the tree-like elongated structure based upon the three-dimensional image data acquired;
    a reformatting unit for ascertainment of curved planar reformations for the tree-like elongated structure;
    a rotation unit for rotation of intersecting segments of the tree-like elongated structure such that segments in the curved planar reformations do not intersect; and
    a scanning unit for unique assignment of a segment of the tree-like elongated structure to each respective point of an image to be output from which, in combination with scan lines, respective associated scan points of the three-dimensional image data acquired are obtained, and for scanning the associated respective scan points obtained to generate the image to be output.

* * * * *